US006529457B1

(12) United States Patent
Narumi et al.

(10) Patent No.: US 6,529,457 B1
(45) Date of Patent: Mar. 4, 2003

(54) OPTICAL INFORMATION RECORDING MEDIUM, OPTICAL INFORMATION RECORDING APPARATUS, AND METHOD OF RECORDING TEST SIGNAL ON THE SAME

(75) Inventors: Kenji Narumi, Osaka (JP); Naoyasu Miyagawa, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/559,554

(22) Filed: Apr. 27, 2000

Related U.S. Application Data

(62) Division of application No. 09/370,288, filed on Aug. 9, 1999.

(30) Foreign Application Priority Data

Sep. 28, 1998 (JP) .............................. 10-273896

(51) Int. Cl.$^7$ ................................. G11B 7/00
(52) U.S. Cl. ................ 369/47.53; 369/53.1; 369/59.1
(58) Field of Search ........................ 369/47.1, 47.11, 369/47.15, 47.49, 47.5, 47.51, 47.53, 53.1, 53.11, 53.76, 53.44, 59.1, 59.11

(56) References Cited

U.S. PATENT DOCUMENTS

| 5,216,657 | A | | 6/1993 | Nishiuchi et al. |
| 5,268,893 | A | | 12/1993 | Call et al. |
| 5,418,770 | A | | 5/1995 | Ide et al. |
| 5,490,126 | A | | 2/1996 | Furumiya et al. |
| 5,513,165 | A | | 4/1996 | Ide et al. |
| 5,550,799 | A | | 8/1996 | Inoue et al. |
| 5,703,841 | A | | 12/1997 | Hiroki |
| 5,841,747 | A | | 11/1998 | Kubota et al. |
| 5,848,045 | A | * | 12/1998 | Kirino et al. ............ 369/47.53 |
| 5,949,747 | A | * | 9/1999 | Miyashita et al. ....... 369/53.26 |
| 6,052,347 | A | | 4/2000 | Miyata |
| 6,351,448 | B1 | | 2/2002 | Tanoue et al. |

FOREIGN PATENT DOCUMENTS

| EP | 446 892 | 9/1991 |
| EP | 477 892 | 4/1992 |
| EP | 557 584 | 9/1993 |
| EP | 737 969 | 4/1996 |
| EP | 718 831 | 6/1996 |

(List continued on next page.)

OTHER PUBLICATIONS

European Search Report (EP 99 306751, Jun. 21, 2000.
N. Murayama et al. "Optical Disk Technology", publ. by Radio Technology Co., Ltd., pp. 222–223 (with partial English translation).

*Primary Examiner*—Muhammad Edun
(74) *Attorney, Agent, or Firm*—Merchant & Gould P.C.

(57) ABSTRACT

An optical information recording apparatus, an optical information recording method, and an optical information recording medium that enable information signals to be recorded precisely by determining recording conditions such as recording power, edge positions of recording pulses, and the like suitably before recording information signals. An edge test signal generation circuit supplies a test signal for optimizing edge positions of recording pulses. In order to suppress the variation in intervals between edges due to mark distortion caused by overwriting, test recording is carried out using this test signal in a plurality of sectors on the optical information recording medium with a test recording start point being shifted at random in each sector by a recording start point shifting circuit. A system control circuit calculates an average of intervals between edges in test signals reproduced from the plurality of sectors and determines the difference between the average and an original interval between edges in the test signal, thus determining a compensation volume for edge positions.

44 Claims, 15 Drawing Sheets

FOREIGN PATENT DOCUMENTS

| | | |
|---|---|---|
| EP | 768 648 | 4/1997 |
| EP | 905 685 | 9/1997 |
| EP | 854 474 | 7/1998 |
| EP | 865 035 | 9/1998 |
| JP | 6-52547 | 7/1992 |
| JP | 5-274675 | 10/1993 |
| JP | 9-219022 | 8/1997 |
| JP | 10-112076 | 4/1998 |

* cited by examiner

OPTICAL INFORMATION RECORDING MEDIUM, OPTICAL INFORMATION RECORDING APPARATUS, AND METHOD OF RECORDING TEST SIGNAL ON THE SAME

This application is a Divisional of application Ser. No. 09/370,288, filed Aug. 9, 1999, which application(s) are incorporated herein by reference.

FIELD OF THE INVENTION

The present invention relates to an optical information recording medium, such as, for example, an optical disk, used for recording and reproducing information optically, an information recording method in which test signals are recorded before the recording of information signals to optimize recording conditions, and an information recording/reproducing apparatus.

BACKGROUND OF THE INVENTION

Recently, as media used for recording information optically, an optical disk, an optical card, an optical tape, and the like have been proposed and developed. Among them, the optical disk has been receiving attention as a medium on which mass information can be recorded with high density and from which the mass information can be reproduced.

One system of rewritable optical disks is a phase-change type optical disk. A recording film used in the phase-change type optical disk is changed to either an amorphous state or a crystalline state depending on a heating condition by a laser beam and a cooling condition. There is reversibility between the amorphous state and the crystalline state. The above-mentioned amorphous state and the crystalline state are different in optical constants (a refractive index and an extinction coefficient) of the recording film. In the phase-change type optical disk, the two states are produced in the recording film selectively according to information signals. By using the optical change (the change in transmittance or reflectance) thus caused, the information signals are recorded and reproduced.

In order to obtain the above-mentioned two states, the following method is used in recording information signals. When a laser beam (with a power level $P_p$) focused by an optical head is irradiated onto a recording film of an optical disk in the form of pulse (which is called "a recording pulse") to increase the temperature of the recording film above its melting point, a molten portion is cooled quickly after the passage of the laser beam to form a recording mark in an amorphous state. On the other hand, when a laser beam (with a power level $P_b$, wherein $P_b < P_p$) is focused and irradiated with a power at a level that allows the temperature of the recording film to increase to the temperature above that causing the recording film to change to a crystalline state but below its melting point, the irradiation part in the recording film is changed to a crystalline state. This power level $P_b$ is called "an erase power".

Thus, corresponding to a recording data signal, a recording pattern including recording marks formed of amorphous areas and portions with no mark (called "spaces") formed of crystalline areas is formed on tracks on the optical disk. By utilizing the differences in optical characteristics between the crystalline areas and the amorphous areas, information signals can be reproduced.

Recently, instead of a mark position recording (that also is called "PPM recording") system, a mark edge recording (that also is called "PWM recording") system has been increasingly used. In the mark position recording, information is given only to positions of recording marks themselves. On the other hand, in the mark edge recording, information is given to both edge positions at a leading edge and a rear edge of each recording mark, resulting in the advantage of improving recording linear density.

Further, as a method of facilitating rotation control of a spindle motor in a recording/reproducing apparatus while increasing recording capacity in an optical disk, a Z-CLV (Zoned Constant Linear Velocity) format has been proposed. In an optical disk with the Z-CLV format, a recording area is divided into zones including a predetermined number of tracks, and the number of sectors around the disk is increased gradually from a zone in the inner circumference toward that in the outer circumference.

In an apparatus used for recording information on and reproducing information from such a Z-CLV disk, information is recorded or reproduced by reducing the rotation speed of the disk gradually from the inner circumference toward the outer circumference (wherein the rotation speed in each zone is constant) and allowing the linear velocity to be substantially constant throughout all rounds on the disk.

The Z-CLV format is described, for example, as "an M-CLV (Modified Constant Linear Velocity) format" in "Optical Disk Technology", page 223, Radio Technique Co. Ltd., (1988).

Optical disks are exchangeable recording media and therefore recording/reproducing apparatuses for optical disks are required to record information on and reproduce information from a plurality of different optical disks stably. However, even in optical disks manufactured under the same conditions, the optimum power level of a laser beam for recording and reproducing information may be different due to irregularity during the manufacture or aging. Further, because of dirt on the substrate surface of an optical disk, the decrease in transmission efficiency in an optical system or the variation in operation condition in a recording/reproducing apparatus, the power of a laser beam reaching a recording film of the optical disk may vary.

In addition, particularly in the mark edge recording system, the variation in thermal characteristics of an optical disk affects the formation state of recording marks themselves and the degree of the thermal interference between the recording marks. Therefore, the optimum edge positions of recording pulses may be different in each optical disk.

An example of methods of recording and reproducing information signals stably without being affected by such variation in optimum power level of a laser beam or in optimum edge positions of recording pulses as described above has been disclosed in JP 4-137224 A. In the example disclosed therein, after carrying out test recording with a specific data pattern (which is called "a test signal") prior to the recording of information signals, the test signal recorded is reproduced and edge positions of recording marks are determined by measuring the signal reproduced, thus controlling the edge positions of recording pulses to be optimum.

As another example, JP 6-195713 A discloses a technique in which edge positions of recording marks are determined and then at least one selected from edge positions of recording pulses and recording power is controlled. In JP 9-63056 A, a method for determining an optimum recording power based on the power dependency of a bit error rate has been disclosed. Further, JP 7-129959 A discloses a method of controlling edge positions of recording pulses according to the length of the recording marks and the length of the spaces directly before and after the respective recording marks.

On the other hand, a method of increasing the number of times an optical disk can be rewritten has been proposed in JP 9-219022 A. In this method, by inverting the polarity (1 or 0) of a recording data signal at random, the concentration of damage at specific positions on a recording film is avoided, thus suppressing the deterioration of the recording film.

However, in the aforementioned conventional methods, since measured values of edge positions of recording marks vary, errors in determining edge positions of recording pulses may occur, which has been a problem. This problem will be explained with reference to FIGS. 11 to 14 as follows.

FIGS. 11 to 14 show examples of mark distortion caused by the position relationship between recording marks that had been recorded previously and recording marks that have been overwritten. Each figure of FIGS. 11 to 14 shows the state of a track on an optical disk before the overwriting of recording marks in the upper section, a pattern of a test signal (as a recording data signal) to be overwritten in the middle section, and the state of the track after the overwriting of the recording marks in the lower section.

Conventionally, in many cases, a predetermined track is assigned as the track on which recording marks for test recording are to be recorded. In this case, recording marks are overwritten on the predetermined track repeatedly. Therefore, when a test signal (or an information signal) had been recorded on the track on which test recording should be carried out, the shapes of the recording marks that have been overwritten and thus recorded are distorted due to the influence of the recording marks that had previously been recorded.

When using a phase-change type optical disk, amorphous areas (i.e. the areas where recording marks are present) and crystalline areas are different in optical absorption property. Therefore, even when laser beams with the same energy are irradiated, the temperature increase rate in a recording film of the optical disk is different in the amorphous areas and the crystalline areas. Thus, in the case of a disk designed so that optical absorptance in the amorphous areas is higher than that in the crystalline areas, recording marks overwritten tend to be increased in size in the amorphous areas. As a result, edge positions of the recording marks shift in the direction in which the recording marks extend as shown with hatching in FIGS. 11 to 14, which is called "mark distortion". When a disk is designed so that optical absorptance in the amorphous areas is lower than that in the crystalline areas, the result opposite to the above may be obtained.

Therefore, the shapes of recording marks vary depending on the overlap condition between recording marks recorded in test recording and recording marks previously recorded. Consequently, the edge positions of the recording marks vary. When a signal that previously has been recorded on a track is the same as or similar to a test signal overwritten, the overlap condition between the previous recording marks and the recording marks overwritten is always the same unless rotational fluctuation of a disk is great. Therefore, depending on the phase relation between a previous data pattern and a data pattern overwritten, measured values of the edge positions vary.

For example, as shown in the upper section in FIG. 11, when a recording mark is overwritten on a track 111 on which a recording mark 113 previously was present using a test signal with the pattern shown in the middle section in FIG. 11, a recording mark 112 overwritten overlaps with the previous recording mark 113, thus causing mark distortion 114 as shown in the lower section.

In the case where a leading edge position of a recording pulse of 3T (wherein T indicates a clock cycle of a recording data signal) is determined by measuring the interval x between the leading edge of the recording mark 112 and that of a recording mark 115, when the mark distortion 114 has occurred only at the end of the recording mark 112 overwritten as shown in FIG. 11, the mark distortion 114 does not affect the interval x. However, as shown in FIG. 12, when the leading edge of the recording mark 115 of a recording pulse of 3T to be overwritten overlaps with the previous recording mark 113, mark distortion 116 occurs at the leading end of the recording mark 115. As a result, the interval x measured is indicated by $x-\Delta_1$.

Further, as shown in FIG. 13, when the leading end of the recording mark 112 of a recording pulse of 10T overlaps with the previous recording mark 113, mark distortion 114 occurs at the leading edge of the recording mark 112. As a result, the interval x measured is indicated by $x+\Delta_2$.

As shown in FIG. 14, when both the leading edges of the recording mark 115 of a recording pulse of 3T and of the recording mark 112 of a recording pulse of 10T overlap with the previous recording mark 113, the interval x measured is indicated by $x+\Delta_2-\Delta_1$.

In the conventional methods, an optimum recording power cannot always be obtained after recording pulses have been controlled to have optimum edge positions, which has been a problem. This problem will be explained with reference to FIG. 15 as follows.

FIG. 15 shows the relationship between recording peak power $P_p$ and a bit error rate (or jitter) when a periodic signal of the shortest mark (for example, a recording mark formed by a recording pulse of 3T in the case of 8–16 modulation, hereafter which is called "a 3T mark") is recorded while varying the recording pulse width.

When edge positions of recording pulses are adjusted by test recording, the length of the recording pulses (or a recording pulse train) varies. Therefore, the energy applied so that the recording pulses form recording marks is affected by the adjustment of the edge positions. This influence becomes significant particularly when a short mark such as the shortest mark is formed. As a result, the optimum recording power also varies.

For instance, when the length of a recording pulse for forming a 3T mark of the shortest mark in the case of 8–16 modulation is shortened due to the adjustment of edge positions, the energy used for forming the 3T mark decreases. Therefore, the peak power dependency of a bit error rate shifts from $g_1$ to $g_2$ as shown in FIG. 15. Consequently, the optimum recording power (which is generally determined by multiplying the power $P_{th1}$ or $P_{th2}$ that allows the bit error rate to be a predetermined threshold value $B_{th}$ by a certain value) becomes higher than that before the adjustment of edge positions.

On the contrary to the above problem, in the conventional methods, optimum edge positions of recording pulses cannot always be obtained after the recording power has been adjusted, which also has been a problem in some cases. This problem will be explained as follows.

When the recording power is adjusted by test recording, the energy applied to a recording film of an optical disk by a laser beam varies. Therefore, even if recording pulses or recording pulse trains have the same length, according to the change in recording power the length, i.e. edge positions, of recording marks formed on a track of the optical disk also are changed. This influence is significant particularly when a short mark is formed. As a result, the optimum edge positions of recording pulses that optimize edge positions of recording marks vary. For instance, when the recording power is increased based on test recording, the leading edge of a 3T mark extends forward and its end edge extends backward. Consequently, the optimum edge positions of the recording pulse for recording the 3T mark cannot be obtained.

In the Z-CLV format, since an optical disk is rotated at a constant rotation speed in each zone, the linear velocity and linear density are different depending on the radius within each zone. In other words, the linear velocity and recording linear density decrease gradually toward the outer circumference within each zone. Therefore, in the conventional methods, when test recording is carried out on an optical disk with the Z-CLV format, an optimum recording power or optimum edge positions of recording pulses cannot always be obtained throughout the whole area within each zone, which has been a problem.

Furthermore, in the method disclosed, for example, in JP 9-219022 A, the polarity of a data pattern is inverted at random even when edge positions of recording pulses are determined by test recording. Therefore, even when the same data pattern is recorded, the relationship between a recording mark and a space (i.e. the relationship between the leading edge and the rear edge of a recording mark) may be reversed depending on the polarity. In this case, the leading edge and the rear edge of a recording mark cannot be distinguished, which has been a problem.

BRIEF DESCRIPTION OF THE INVENTION

In order to solve the aforementioned conventional problems, the present invention seeks to provide an optical information recording apparatus, an optical information recording method, and an optical information recording medium that enable information signals to be recorded precisely by determining recording conditions such as recording power, edge positions of recording pulses, and the like suitably by test recording.

In order to attain the above-mentioned object, a first optical information recording apparatus of the present invention comprises: a test signal generation means that generates a test signal; a recording means that converts the test signal and an information signal to a recording data signal, drives a light source based on the recording data signal, and records the test signal and the information signal on an optical information recording medium; a recording start point shifting means that shifts a start point for test recording on the optical information recording medium at random in each sector; a reproducing means that reproduces signals from the optical information recording medium; and a recording condition determination means that allows the test signal generation means to supply the test signal to the recording means, carries out the test recording in a plurality of sectors on the optical information recording medium, and then determines edge positions of pulses in the recording data signal based on an average of results obtained by reproducing the test signal from each of the plurality of sectors by the reproducing means.

According to this configuration, the recording start point of the test signal to be recorded in each of the plurality of sectors on the optical information recording medium is shifted at random in each sector. Therefore, recording marks that previously have been recorded in an area intended for the test recording and recording marks of the test signal overwritten thereon overlap in random conditions in each sector. Thus, shifts in interval between edges in the test signal that are caused by mark distortion produced by the overwriting of the recording marks of the test signal on the recording marks that previously have been recorded are averaged. Consequently, variation caused by the phase relation between the recording marks that previously have been recorded on the optical information recording medium and the recording marks of the test signal does not occur in values of the intervals between edges that are calculated from test signals reproduced. As a result, the interval between edges of recording marks of the test signal can be calculated precisely, thus providing an optical information recording apparatus that can record information signals precisely by optimizing edge positions in the recording data signal.

In order to attain the aforementioned object, a second optical information recording apparatus of the present invention comprises: a test signal generation means that generates a test signal; a recording means that converts the test signal and an information signal to a recording data signal, drives a light source based on the recording data signal, and records the test signal and the information signal on an optical information recording medium; a data pattern generation means that generates a data pattern having substantially no correlation with the test signal; a reproducing means that reproduces signals from the optical information recording medium; and a recording condition determination means that allows the data pattern generation means to supply the data pattern to the recording means to record the data pattern in an area for carrying out the test recording on the optical information recording medium, then allows the test signal generation means to supply the test signal to the recording means to overwrite the test signal in the area, and determines a proper value for edge positions of recording pulses in the recording data signal based on a result obtained by reproducing the test signal from the area by the reproducing means.

According to this configuration, before the test recording carried out on the optical information recording medium, the data pattern having substantially no correlation with the test signal is recorded in the area intended for the test recording and therefore recording marks of the test signal overwritten in the area and recording marks that previously have been recorded overlap in random conditions. Thus, shifts in interval between edges in the test signal that are caused by mark distortion produced by the overwriting of the recording marks of the test signal on the recording marks that previously have been recorded are averaged. Consequently, variation caused by the phase relation between the recording marks that previously have been recorded on the optical information recording medium and the recording marks of the test signal does not occur in values of the intervals between edges that are calculated from test signals reproduced. As a result, the interval between edges of recording marks of the test signal can be calculated precisely, thus providing an optical information recording apparatus that can record information signals precisely by optimizing edge positions in the recording data signal.

It is preferable that the second optical information recording apparatus is further provided with a recording start point shifting means that shifts a recording start point at random in each sector on the optical information recording medium to shift the recording start point at least of the test signal at random.

According to this configuration, shifts in interval between edges in the test signal that are caused by the overwriting of the recording marks of the test signal on the recording marks that previously have been recorded can be further averaged, thus optimizing the edge positions in the recording data signal further precisely.

In the second optical information recording apparatus, it is preferable that the data pattern is a random pattern.

According to this configuration, since a random pattern is recorded in the area intended for the test recording, shifts in interval between edges in the test signal that are caused by the overwriting of the recording marks of the test signal on the recording marks that previously have been recorded can be further averaged, thus enabling an optimum value for edge positions in the recording data signal to be determined further precisely.

In order to attain the aforementioned object, a third optical information recording apparatus of the present invention comprises: a test signal generation means that generates a test signal; a recording/erasing means that is operated either in a recording mode in which the test signal and an information signal are converted to a recording data signal, a light source is driven based on the recording data signal, and the test signal and the information signal are recorded on an optical information recording medium or in an erasing mode in which light is irradiated onto the optical information recording medium with a predetermined erase power by driving the light source and thus information is erased from the optical information recording medium; a reproducing means that reproduces signals from the optical information recording medium; and a recording condition determination means that allows the recording/erasing means to operate in the erasing mode to erase information in an area for carrying out test recording on the optical information recording medium, then allows the recording/erasing means to operate in the recording mode to record the test signal supplied from the test signal generation means in the area, and determines a proper value for edge positions of recording pulses in the recording data signal based on a result obtained by reproducing the test signal from the area by the reproducing means.

According to this configuration, the area intended for the test recording on the optical information recording medium assumes an initialized condition regardless of the states of recording marks that previously have been recorded. Therefore, shifts in interval between edges in the test signal are not caused, thus optimizing the edge positions in the recording data signal further precisely.

In order to attain the aforementioned object, a first optical information recording method comprises steps of: (a) generating a test signal; (b) shifting, at random in each sector, a start point of the test recording of the test signal generated on an optical information recording medium; (c) converting the test signal shifted at random to a recording data signal, driving a light source based on the recording data signal, and carrying out the test recording in a plurality of sectors on the optical information recording medium; (d) reproducing the test signal recorded at the step (c) from each of the plurality of sectors on the optical information recording medium; (e) calculating an average of results obtained by reproducing the test signal; and (f) determining edge positions of recording pulses in the recording data signal based on the average calculated.

According to this method, the recording start point of the test signal recorded in each of the plurality of sectors on the optical information recording medium is shifted at random in each sector. Therefore, recording marks that previously have been recorded in the area intended for the test recording and recording marks of the test signal overwritten thereon overlap in random conditions in each sector. Thus, shifts in interval between edges in the test signal that are caused by mark distortion produced by the overwriting of the recording marks of the test signal on the recording marks that previously have been recorded are averaged. Consequently, variation caused by the phase relation between the recording marks that previously have been recorded on the optical information recording medium and the recording marks of the test signal does not occur in values of the intervals between edges that are calculated from test signals reproduced. As a result, the interval between edges of recording marks of the test signal can be calculated precisely, thus providing an optical information recording apparatus that can record information signals precisely by optimizing edge positions in the recording data signal.

In order to attain the aforementioned object, a second optical information recording method of the present information comprises steps of: (a) generating a data pattern having substantially no correlation with a test signal used for the above-mentioned test recording; (b) converting the data pattern generated to a recording data signal, driving a light source based on the recording data signal, and recording the data pattern in an area for carrying out the test recording on an optical information recording medium; (c) generating the test signal; (d) converting the test signal generated to a recording data signal, driving the light source based on the recording data signal, and overwriting the test signal in the area on the optical information recording medium; (e) reproducing the test signal overwritten at the step (d) from the area on the optical information recording medium; and (f) determining a proper value for edge positions of recording pulses in the recording data signal based on a result obtained by reproducing the test signal.

According to this method, before the test recording carried out on the optical information recording medium, the data pattern having substantially no correlation with the test signal is recorded in the area intended for the test recording and therefore recording marks of the test signal overwritten in the area and recording marks that previously have been recorded overlap in random conditions. Thus, shifts in interval between edges in the test signal that are caused by mark distortion produced by the overwriting of the recording marks of the test signal on the recording marks that previously have been recorded are averaged. Consequently, variation caused by the phase relation between the recording marks that previously have been recorded on the optical information recording medium and the recording marks of the test signal does not occur in values of the intervals between edges that are calculated from test signals reproduced. As a result, the interval between edges of recording marks of the test signal can be calculated precisely, thus providing an optical information recording apparatus that can record information signals precisely by optimizing edge positions in the recording data signal.

It is preferable that the second optical information recording method further comprises a step of shifting a recording start point at random in each sector on the optical information recording medium and in this step the recording start point at least of the test signal is shifted at random.

According to this method, shifts in interval between edges in the test signal that are caused by the overwriting of the recording marks of the test signal on the recording marks that previously have been recorded can be further averaged, thus optimizing the edge positions in the recording data signal further precisely.

In the second optical information recording method, it is preferable that the data pattern is a random pattern.

According to this method, since a random pattern is recorded in the area intended for the test recording, shifts in interval between edges in the test signal that are caused by the overwriting of the recording marks of the test signal on the recording marks that previously have been recorded can be further averaged, thus enabling an optimum value for edge positions in the recording data signal to be determined further precisely.

In order to attain the aforementioned object, a third optical information recording method of the present information comprises steps of: (a) erasing information in an area for carrying out the above-mentioned test recording from an optical information recording medium by driving a light source to irradiate light onto the optical information recording medium with a predetermined erase power; (b) generating a test signal; (c) converting the test signal generated to a recording data signal, driving the light source based on the recording data signal, and recording the test signal in the area for carrying out the test recording on the optical information recording medium; (d) reproducing the test signal recorded at the step (c) from the area on the optical information recording medium; and (e) determining a proper value for edge positions of recording pulses in the recording data signal based on a result obtained by reproducing the test signal.

According to this method, the area intended for the test recording on the optical information recording medium assumes an initialized condition regardless of the states of recording marks that previously have been recorded. Therefore, shifts in interval between edges in the test signal are not caused, thus optimizing the edge positions in the recording data signal further precisely.

In order to attain the aforementioned object, a fourth optical information recording apparatus of the present invention comprises: a test signal generation means that generates an edge test signal and a power test signal; a recording means that converts the edge test signal, the power test signal, and an information signal to a recording data signal, drives a light source based on the recording data signal, and records the edge test signal, the power test signal, and the information signal on an optical information recording medium; a recording pulse edge adjusting means that adjusts edge positions of recording pulses in the recording data signal; a reproducing means that reproduces signals from the optical information recording medium; a first recording condition determination means that allows the test signal generation means to supply the edge test signal to the recording means to record the edge test signal on the optical information recording medium and determines a set value for the edge positions of recording pulses for the recording pulse edge adjusting means based on a result obtained by reproducing the edge test signal from the optical information recording medium by the reproducing means; and a second recording condition determination means that allows the test signal generation means to supply the power test signal to the recording means to record the power test signal on the optical information recording medium and determines a set value of recording power of the light source for the recording means based on a result obtained by reproducing the power test signal from the optical information recording medium by the reproducing means. In the fourth optical information recording apparatus, the first recording condition determination means determines a proper value for the edge positions of recording pulses for the recording pulse edge adjusting means based on a result obtained by reproducing an edge test signal recorded with a recording power whose set value is an initial value. The second recording condition determination means determines a proper value of the recording power of the light source for the recording means based on a result obtained by reproducing the power test signal recorded with edge positions of recording pulses of which the set value determined by the first recording condition determination means is the proper value.

According to this configuration, after the determination of the proper value for the edge positions of recording pulses, test recording is further carried out with the recording pulses that have been set to the proper value to optimize the recording power, thus optimizing both the edge positions of recording pulses and the recording power. Therefore, information signals can be recorded precisely on the optical information recording medium.

It is preferable that the fourth optical information recording apparatus further comprises a recording start point shifting means that shifts a recording start point at random in each sector on the optical information recording medium when the test recording of the edge test signal is carried out.

According to this configuration, shifts in interval between edges in the test signals that are caused by the overwriting of the recording marks of the test signals on recording marks that previously have been recorded in the area intended for the test recording on the optical information recording medium can be averaged, thus optimizing the edge positions in the recording data signal further precisely.

It is preferable that the fourth optical information recording apparatus further comprises a data pattern generation means that generates a data pattern having substantially no correlation with the edge test signal and the data pattern is recorded before the test recording of the edge test signal by the recording means in an area where the edge test signal is to be recorded on the optical information recording medium.

According to this configuration, the correlation between the recording marks of the test signals overwritten in the area intended for the test recording and recording marks that previously have been recorded is further decreased. Therefore, shifts in interval between edges in the test signals can be averaged, thus optimizing the edge positions in the recording data signal further precisely.

In the fourth optical information recording apparatus, it is preferable that the first recording condition determination means is provided with a means for comparing an interval between edges in the edge test signal and that in a reproduction signal obtained by reproducing the edge test signal from the optical information recording medium to determine the proper value for the edge positions of recording pulses.

It is preferable that the fourth optical information recording apparatus further comprises a measurement means for measuring either a bit error rate or jitter of the reproduction signal obtained by reproducing the edge test signal from the optical information recording medium and the first recording condition determination means determines an edge position of a recording pulse that allows a measurement result by the measurement means to be the minimum as the proper value.

It is preferable that the fourth optical information recording apparatus further comprises a measurement means for measuring either a bit error rate or jitter of a reproduction signal obtained by reproducing the power test signal from the optical information recording medium and the second recording condition determination means determines the proper value of the recording power based on a recording power value that allows a measurement result by the measurement means to be a predetermined value or less.

In the fourth optical information recording apparatus, it is preferable that the second recording condition determination means determines the initial value of the recording power of the light source for the recording means based on a result obtained by reproducing the power test signal recorded with edge positions of recording pulses of which the set value determined by the first recording condition determination means is a predetermined value.

According to this configuration, both the edge positions of recording pulses and the recording power can be optimized further precisely, thus enabling information signals to be recorded on the optical information recording medium precisely.

Further, it is preferable that a measurement means for measuring either a bit error rate or jitter of a reproduction signal obtained by reproducing the power test signal from the optical information recording medium is further provided and the second recording condition determination means determines the proper value of the recording power based on a recording power value that allows a measurement result by the measurement means to be a predetermined value or less and uses the proper value as the initial value of the recording power.

In order to attain the aforementioned object, a fourth optical information recording method comprises steps of: (a) setting recording power of a light source to an initial value and recording an edge test signal on an optical information recording medium; (b) determining a proper value for edge positions of recording pulses based on a result obtained by reproducing the edge test signal recorded at the step (a) from the optical information recording medium; (c) setting the edge positions of recording pulses to the proper value determined at the step (b) and recording a power test signal on the optical information recording medium; and (d) determining a proper value of the recording power based on a result obtained by reproducing the power test signal recorded at the step (c) from the optical information recording medium.

In this method, after the determination of the proper value for the edge positions of recording pulses, test recording is further carried out with the recording pulses that have been set to the proper value, thus optimizing the recording power. Consequently, both the edge positions of recording pulses and the recording power can be optimized, thus enabling information signals to be recorded on the optical information recording medium precisely.

In the fourth optical information recording method, it is preferable that a recording start point on the optical information recording medium is shifted at random in each sector at the step (a).

According to this method, shifts in interval between edges in the test signal that are caused by the overwriting of the recording marks of the test signal on recording marks that previously have been recorded in the area intended for the test recording on the optical information recording medium can be averaged, thus optimizing the edge positions in the recording data signal further precisely.

It is preferable that the fourth optical information recording method comprises, before the step (a), a step of recording a data pattern having substantially no correlation with the edge test signal and the power test signal in the area for carrying out the test recording on the optical information recording medium.

According to this method, the correlation between the recording marks of the test signal overwritten in the area intended for the test recording and recording marks that previously have been recorded is further decreased. Therefore, shifts in interval between edges in the test signal can be averaged, thus optimizing the edge positions in the recording data signal further precisely.

In the fourth optical information recording method, it is preferable that the step (b) comprises a step of comparing an interval between edges in the edge test signal and that in a reproduction signal obtained by reproducing the edge test signal from the optical information recording medium.

Alternatively, in the fourth optical information recording method, it is preferable that the step (b) comprises a step of measuring either a bit error rate or jitter of the reproduction signal obtained by reproducing the edge test signal from the optical information recording medium to determine an edge position of a recording pulse that allows a measurement result to be the minimum as the proper value.

In the fourth optical information recording method, it is preferable that the step (d) comprises a step of measuring either a bit error rate or jitter of a reproduction signal obtained by reproducing the power test signal from the optical information recording medium to determine the proper value of the recording power based on a recording power value that allows a measurement result to be a predetermined value or less.

It is preferable that the fourth optical information recording method further comprises, prior to the step (a), steps of: (e-1) recording the power test signal on the optical information recording medium with edge positions of recording pulses being set to a predetermined value; and (e-2) determining a proper value of the recording power based on a result obtained by reproducing the power test signal recorded at the step (e-1) from the optical information recording medium, and the proper value of the recording power determined at the step (e-2) is used as the initial value of the recording power at the step (a).

Thus, both the edge positions of recording pulses and the recording power can be optimized further precisely, thus enabling information signals to be recorded on the optical information recording medium precisely.

Further, it is preferable that the step (e-2) comprises a step of measuring either a bit error rate or jitter of the reproduction signal obtained by reproducing the power test signal from the optical information recording medium to determine the proper value of the recording power based on a recording power value that allows a measurement result to be a predetermined value or less.

In order to attain the aforementioned object, a fifth optical information recording apparatus of the present invention comprises: a test signal generation means that generates an edge test signal and a power test signal; a recording means that converts the edge test signal, the power test signal, and an information signal to a recording data signal, drives a light source based on the recording data signal, and records the edge test signal, the power test signal, and the information signal on the optical information recording medium; a recording pulse edge adjusting means that adjusts edge positions of recording pulses in the recording data signal; a reproducing means that reproduces signals from the optical information recording medium; a first recording condition determination means that allows the test signal generation means to supply the edge test signal to the recording means to record the edge test signal on the optical information recording medium and determines a set value for the edge positions of recording pulses for the recording pulse edge adjusting means based on a result obtained by reproducing the edge test signal from the optical information recording medium by the reproducing means; and a second recording condition determination means that allows the test signal generation means to supply the power test signal to the recording means to record the power test signal on the optical information recording medium and determines a set value of recording power of the light source for the recording means based on a result obtained by reproducing the power test signal from the optical information recording medium by the reproducing means. In the fifth optical information recording apparatus, the second recording condition determination means determines a proper value of the recording power of the light source for the recording means based on a result obtained by reproducing the power test signal recorded with the edge positions of recording pulses whose set value is an initial value. The first recording condition determination means determines a proper value for the edge positions of recording pulses for the recording pulse edge adjusting means based on a result obtained by reproducing the edge test signal recorded with a recording power of which the set value determined by the second recording condition determination means is the above-mentioned proper value.

According to this configuration, after the determination of the proper value of the recording power, test recording is further carried out with the recording power set to the proper value, thus optimizing the edge positions of recording pulses. Consequently, both the edge positions of recording pulses and the recording power can be optimized, thus enabling information signals to be recorded on the optical information recording medium precisely.

It is preferable that the fifth optical information recording apparatus further comprises a recording start point shifting means that shifts a recording start point at random in each sector on the optical information recording medium when the test recording of the edge test signal is carried out.

According to this configuration, shifts in interval between edges in the test signals that are caused by the overwriting of the recording marks of the test signals on recording marks that previously have been recorded in the area intended for the test recording on the optical information recording medium can be averaged, thus optimizing the edge positions in the recording data signal further precisely.

It is preferable that the fifth optical information recording apparatus further comprises a data pattern generation means that generates a data pattern having substantially no correlation with the edge test signal and the data pattern is recorded before the test recording of the edge test signal by the recording means in the area where the edge test signal and the power test signal are to be recorded on the optical information recording medium.

According to this configuration, the correlation between the recording marks of the test signals to be overwritten in the area intended for the test recording and recording marks that previously have been recorded is further decreased. Therefore, shifts in interval between edges in the test signals can be averaged, thus optimizing the edge positions in the recording data signal further precisely.

It is preferable that the fifth optical information recording apparatus further comprises a measurement means for measuring either a bit error rate or jitter of a reproduction signal obtained by reproducing the power test signal from the optical information recording medium and the second recording condition determination means determines the proper value of the recording power based on a recording power value that allows a measurement result by the measurement means to be a predetermined value or less.

In the fifth optical information recording apparatus, it is preferable that the first recording condition determination means is provided with a means for comparing an interval between edges in the edge test signal and that in a reproduction signal obtained by reproducing the edge test signal from the optical information recording medium to determine the proper value for the edge positions of recording pulses.

It is preferable that the fifth optical information recording apparatus further comprises a measurement means for measuring either a bit error rate or jitter of the reproduction signal obtained by reproducing the edge test signal from the optical information recording medium and the first recording condition determination means determines an edge position of a recording pulse that allows a measurement result by the measurement means to be the minimum as the proper value.

In the fifth optical information recording apparatus, it is preferable that the first recording condition determination means determines the initial value for the edge positions of recording pulses for the recording pulse edge adjusting means based on the result obtained by reproducing the edge test signal recorded with recording power of which the set value determined by the second recording condition determination means is a predetermined value.

Thus, both the edge positions of recording pulses and the recording power can be optimized further precisely, thus enabling information signals to be recorded on the optical information recording medium precisely.

Further, it is preferred to further comprises a recording start point shifting means that shifts a recording start point at random in each sector on the optical information recording medium when the test recording of the edge test signal is carried out.

In addition, it is preferable that a data pattern generation means that generates a data pattern having substantially no correlation with the edge test signal is further provided and the data pattern is recorded before the test recording of the edge test signal by the recording means in the area where the edge test signal is to be recorded on the optical information recording medium.

It is preferable that the first recording condition determination means is provided with a means for comparing an interval between edges in the edge test signal and that in the reproduction signal obtained by reproducing the edge test signal from the optical information recording medium to determine a proper value for the edge positions of recording pulses.

It is preferable that a measurement means for measuring either a bit error rate or jitter of the reproduction signal obtained by reproducing the edge test signal from the optical information recording medium is further provided, the first recording condition determination means determines an edge position of a recording pulse that allows a measurement result by the measurement means to be the minimum as a proper value, and the proper value for the edge positions of recording pulses thus determined is used as the initial value.

In order to attain the aforementioned object, a fifth optical information recording method of the present invention comprises steps of: (a) setting edge positions of recording pulses to an initial value and recording a power test signal on an optical information recording medium; (b) determining a proper value of recording power of a light source based on a result obtained by reproducing the power test signal recorded at the step (a) from the optical information recording medium; (c) recording an edge test signal on the optical information recording medium based on the recording power determined at the step (b); and (d) determining a proper value for the edge positions of recording pulses based on a result obtained by reproducing the edge test signal recorded at the step (c) from the optical information recording medium.

In this method, after the determination of the proper value of the recording power, test recording is further carried out with the recording power set to the proper value, thus optimizing the edge positions of recording pulses. Consequently, both the edge positions of recording pulses and the recording power can be optimized, thus enabling information signals to be recorded on the optical information recording medium precisely.

In the fifth optical information recording method, it is preferable that a recording start point on the optical information recording medium is shifted at random in each sector at the step (c).

According to this method, shifts in interval between edges in the test signals that are caused by the overwriting of the recording marks of the test signals on recording marks that previously have been recorded in the area intended for the test recording on the optical information recording medium can be averaged, thus optimizing the edge positions in the recording data signal further precisely.

It is preferable that the fifth optical information recording method comprises, before the step (c), a step of recording a data pattern having substantially no correlation with the edge test signal in the area for carrying out the test recording on the optical information recording medium.

According to this method, the correlation between the recording marks of the test signals to be overwritten in the area intended for the test recording and recording marks that previously have been recorded is further decreased. Therefore, shifts in interval between edges in the test signals can be averaged, thus optimizing the edge positions in the recording data signal further precisely.

In the fifth optical information recording method, it is preferable that the step (b) comprises a step of measuring either a bit error rate or jitter of a reproduction signal obtained by reproducing the power test signal from the optical information recording medium and the proper value of the recording power is determined based on a recording power value that allows the measurement result to be a predetermined value or less.

In the fifth optical information recording method, it is preferable that the step (d) comprises a step of comparing an interval between edges in the edge test signal and that in a reproduction signal obtained by reproducing the edge test signal from the optical information recording medium.

In the fifth optical information recording method, it is preferable that the step (d) comprises a step of measuring either a bit error rate or jitter of the reproduction signal obtained by reproducing the edge test signal from the optical information recording medium and an edge position of a recording pulse that allows a measurement result to be the minimum is determined as the proper value.

It is preferable that the fifth optical information recording method further comprises, prior to the step (a), steps of: (e-1) recording the edge test signal on the optical information recording medium with recording power being set to a predetermined value; and (e-2) determining a proper value for the edge positions of recording pulses based on a result obtained by reproducing the edge test signal recorded at the step (e-1) from the optical information recording medium, and the proper value for the edge positions of recording pulses determined at the step (e-2) is used as the initial value for the edge positions of recording pulses at the step (a).

Thus, both the edge positions of recording pulses and the recording power can be optimized further precisely, thus enabling information signals to be recorded on the optical information recording medium precisely.

Further, it is preferable that a recording start point on the optical information recording medium is shifted at random in each sector at the step (e-1).

It is preferred to comprise, before the step (e-1), a step of recording a data pattern having substantially no correlation with the edge test signal in the area for carrying out the test recording on the optical information recording medium.

It is preferable that the step (e-2) comprises a step of comparing an interval between edges in the edge test signal and that in the reproduction signal obtained by reproducing the edge test signal from the optical information recording medium.

It is preferable that the step (e-2) comprises a step of measuring either a bit error rate or jitter of the reproduction signal obtained by reproducing the edge test signal from the optical information recording medium and an edge position of a recording pulse that allows a measurement result to be the minimum is determined as the proper value.

In order to attain the aforementioned object, a sixth optical information recording apparatus of the present invention comprises: a test signal generation means that generates a test signal; a recording means that converts the test signal and an information signal to a recording data signal, drives a light source based on the recording data signal, and records the test signal and the information signal on an optical information recording medium; a polarity inverting means that inverts polarity of the recording data signal; a polarity inversion control means that supplies only one of an inverted signal and a non-inverted signal of the recording data signal converted from the test signal to the recording means when test recording is carried out and any one selected at random in each sector from an inverted signal and a non-inverted signal of the recording data signal converted from the information signal to the recording means when the information signal is recorded; a recording pulse edge adjusting means that adjusts edge positions of recording pulses in the recording data signal; a reproducing means that reproduces signals from the optical information recording medium; and a recording condition determination means that determines a proper value for the edge positions of recording pulses based on a result obtained by reproducing the test signal from the optical information recording medium by the reproducing means and supplies the proper value to the recording pulse edge adjusting means.

According to this configuration, the number of times the optical information recording medium can be rewritten increases and an optical information recording apparatus that can record information signals precisely under the recording conditions optimized by the test recording can be provided.

It is preferable that the sixth optical information recording apparatus further comprises a recording start point shifting means that shifts a recording start point of the recording data signal at random in each sector on the optical information recording medium.

According to this configuration, shifts in interval between edges in the test signal that are caused by the overwriting of the recording marks of the test signal on recording marks that previously have been recorded in the area intended for the test recording on the optical information recording medium can be averaged, thus optimizing the edge positions in the recording data signal further precisely.

It is preferable that the sixth optical information recording apparatus further comprises a data pattern generation means that generates a data pattern having substantially no correlation with the test signal and the data pattern is recorded on a track intended for the test recording before the test recording is carried out.

According to this configuration, the recording marks of the test signal overwritten in the area intended for the test recording and recording marks that previously have been recorded overlap in random conditions. Therefore, shifts in interval between edges in the test signal can be averaged, thus optimizing the edge positions in the recording data signal further precisely.

In the sixth optical information recording apparatus, it is preferable that the recording condition determination means is provided with a means for comparing an interval between edges in the test signal and that in a reproduction signal obtained by reproducing the test signal from the optical information recording medium to determine the proper value for the edge positions of recording pulses.

It is preferable that the sixth optical information recording apparatus further comprises a measurement means for measuring either a bit error rate or jitter of the reproduction signal obtained by reproducing the test signal from the optical information recording medium, and the recording condition determination means determines an edge position of a recording pulse that allows a measurement result by the measurement means to be a predetermined value or less as the proper value.

It is preferable that the sixth optical information recording apparatus is provided with a second test signal generation means that generates a second test signal and a second recording condition determination means. The second recording condition determination means records any one of an inverted signal and a non-inverted signal of the second test signal on the optical information recording medium with edge positions of recording pulses being set to the proper value by the recording pulse edge adjusting means, and the inverted signal and the non-inverted signal are supplied from the second test signal generation means and have been selected at random in each sector by the polarity inversion control means. Then the second recording condition determination means determines a proper value of the recording power of the light source for the recording means based on a result obtained by reproducing the second test signal from the optical information recording medium by the reproducing means.

In test recording for determining the recording power, there is a high possibility that the test recording is carried out with a higher recording power than that used in test recording for determining the edge positions of recording pulses and in normal recording of information signals. According to this configuration, in the test recording for determining the recording power, the test recording is carried out while inverting the polarity of the second test signal at random, thus preventing a recording film in the area intended for the test recording on the optical information recording medium from being deteriorated.

Further, it is preferable that the sixth optical information recording apparatus further comprises a measurement means for measuring either a bit error rate or jitter of a reproduction signal obtained by reproducing the second test signal from the optical information recording medium, and the second recording condition determination means determines the proper value of the recording power based on a recording power value that allows a measurement result by the measurement means to be a predetermined value or less.

In order to attain the aforementioned object, a sixth optical information recording method comprises steps of: (a) determining randomly whether the polarity of a first test signal is to be inverted and carrying out test recording of only one of an inverted signal and a non-inverted signal of the first test signal on a predetermined track of an optical information recording medium; (b) determining a proper value for edge positions of recording pulses based on a result obtained by reproducing the first test signal that has been recorded at the step (a) from the optical information recording medium; and (c) selecting, at random in each sector, any one of an inverted signal and a non-inverted signal of an information signal to be recorded on the optical information recording medium and recording a selected signal on the optical information recording medium with edge positions of recording pulses being set to the proper value determined at the step (b).

According to this method, the number of times the optical information recording medium can be rewritten increases and information signals can be recorded precisely under the recording conditions optimized by the test recording.

In the sixth optical information recording method, it is preferable that a recording start point on the optical information recording medium is shifted at random in each sector at the step (a).

According to this method, shifts in interval between edges in the test signal that are caused by the overwriting of the recording marks of the test signal on recording marks that previously have been recorded in the area intended for the test recording on the optical information recording medium can be averaged, thus optimizing the edge positions in the recording data signal further precisely.

It is preferable that the sixth optical information recording method comprises, before the step (a), a step of recording a data pattern having substantially no correlation with the first test signal on the predetermined track.

According to this method, the recording marks of the test signal overwritten in the area intended for the test recording and recording marks that previously have been recorded overlap in random conditions. Therefore, shifts in interval between edges in the test signal can be averaged, thus optimizing the edge positions in the recording data signal further precisely.

In the sixth optical information recording method, it is preferable that the step (b) comprises a step of comparing an interval between edges in the first test signal and that in a reproduction signal obtained by reproducing the first test signal from the optical information recording medium.

In the sixth optical information recording method, it is preferable that the step (b) comprises a step of measuring either a bit error rate or jitter of the reproduction signal obtained by reproducing the first test signal from the optical information recording medium and an edge position of a recording pulse that allows a measurement result to be the minimum is determined as the proper value.

It is preferable that the sixth optical information recording method further comprises, between the steps (b) and (c), a step (b-1) of selecting any one of an inverted signal and a non-inverted signal of a second test signal at random in each sector and recording a selected signal on the optical information recording medium with edge positions of recording pulses being set to the proper value determined at the step (b), and a step (b-2) of determining a proper value of the recording power based on a result obtained by reproducing the second test signal recorded at the step (b-1) from the optical information recording medium.

In test recording for determining the recording power, there is a high possibility that the test recording is carried out with a higher recording power than that used in test recording for determining the edge positions of recording pulses and in normal recording of information signals. According to this method, at the step (b-1) of carrying out the test recording for determining the recording power, the test recording is carried out while inverting the polarity of the second test signal at random, thus preventing a recording film in the area intended for the test recording on an optical information recording medium from being deteriorated.

Further, it is preferable that the step (b-2) comprises a step of measuring either a bit error rate or jitter of a reproduction signal obtained by reproducing the second test signal from the optical information recording medium and a proper value of the recording power is determined based on a recording power value that allows a measurement result to be a predetermined value or less.

In order to attain the aforementioned object, a seventh optical information recording method of the present invention employs an optical information recording medium with a Z-CLV format in which a plurality of zones including a predetermined number of tracks are comprised in a recording area, the number of sectors around the disk recording medium increases gradually from an inner zone toward an outer zone, and recording linear density decreases gradually from an inner circumference toward an outer circumference within one zone. In the seventh optical information recording method, test recording is carried out on the optical information recording medium before an information signal is recorded on the optical information recording medium. The seventh optical information recording method is characterized by comprising a step (a) of carrying out the test recording for recording a test signal with substantially the same recording linear density as that of an information signal on an innermost track in each zone and a step (b) of determining a proper value for either edge positions of recording pulses or recording power based on a result obtained by reproducing the test signal from the optical information recording medium.

According to this method, an excellent result as to jitter (or an excellent bit error rate) can be obtained throughout from an innermost circumference to an outermost circumference in each zone and therefore information signals can be recorded precisely.

In the seventh optical information recording method, it is preferable that the step (b) comprises a step of measuring either a bit error rate or jitter of a reproduction signal obtained by reproducing the test signal from the optical information recording medium and the proper value of the recording power is determined based on a recording power value that allows a measurement result to be a predetermined value or less.

In the seventh optical information recording method, it is preferable that at the step (a), the track for the test recording is located substantially at an innermost circumference at least in one zone.

In the seventh optical information recording method, it is preferable that at the step (a), the track for the test recording is located at the inner or outer side with respect to the recording area on the optical information recording medium.

In order to attain the aforementioned object, a first optical information recording medium of the present invention is an optical information recording medium with a Z-CLV format in which a plurality of zones including a predetermined number of tracks are comprised in a recording area, the number of sectors around the recording medium increases gradually from an inner zone toward an outer zone, and recording linear density decreases gradually from an inner circumference toward an outer circumference within one zone. The first optical information recording medium is characterized by having an area for test recording substantially at an innermost circumference at least in one of the zones.

In order to attain the aforementioned object, a second optical information recording medium of the present invention is an optical information recording medium with a Z-CLV format in which a plurality of zones including a predetermined number of tracks are comprised in a recording area, the number of sectors around the recording medium increases gradually from an inner zone toward an outer zone, and recording linear density decreases gradually from an inner circumference toward an outer circumference within one zone. The second optical information recording medium is characterized by having a test recording area at inner and outer sides with respect to the recording area and the recording linear density in the test recording area is substantially the same as that of an information signal on an innermost track in each zone within the recording area.

In the first and second optical information recording media, it is preferable that a recording film is formed of a phase-change material.

In the first to sixth optical information recording apparatuses, it is preferable that test recording and recording conditions are set at least at one time selected from the times: in adjusting the optical information recording apparatus; on starting the optical information recording apparatus; after a lapse of a predetermined time from the starting; in exchanging the optical information recording medium; when a bit error rate of the optical information recording medium exceeds a predetermined value; and when environmental temperature changes.

According to this configuration, variable factors among optical information recording apparatuses can be compensated by carrying out test recording in adjusting the recording/reproducing apparatuses. Variable factors in an optical information recording apparatus itself can be compensated by carrying out test recording on starting the optical information recording apparatus and after a lapse of a predetermined time from the starting. In addition, by carrying out test recording in exchanging an optical information recording medium, variable factors between optical information recording media can be compensated. Further, by carrying out test recording when a bit error rate of an optical information recording medium exceeds a predetermined value, variable factors in the optical information recording medium itself can be compensated. By carrying out test recording when environmental temperature changes, variable factors caused by the temperature dependency of an optical information recording apparatus and an optical information recording medium can be compensated.

The optical information recording apparatus that records information on an optical information recording medium by the first to seventh optical information recording methods is characterized by setting test recording and recording conditions at least at one time selected from the times: in adjusting the recording/reproducing apparatus; on starting the recording/reproducing apparatus; after a lapse of a predetermined time from the starting; in exchanging the optical information recording medium; when a bit error rate of the optical information recording medium exceeds a predetermined value; and when environmental temperature changes.

According to this configuration, variable factors among optical information recording apparatuses can be compensated by carrying out test recording in adjusting the recording/reproducing apparatuses. Variable factors in an optical information recording apparatus itself can be compensated by carrying out test recording on starting the optical information recording apparatus and after a lapse of a predetermined time from the starting. In addition, by carrying out test recording in exchanging an optical information recording medium, variable factors between optical information recording media can be compensated. Further, by carrying out test recording when a bit error rate of an optical information recording medium exceeds a predetermined value, variable factors in the optical information recording medium itself can be compensated. By carrying out test recording when environmental temperature changes, variable factors caused by the temperature dependency of an optical information recording apparatus and an optical information recording medium can be compensated.

Moreover, in the first to sixth optical information recording apparatuses, it is preferable that a recording film of the optical information recording medium is formed of a phase-change material.

In the first to seventh optical information recording methods, it is preferable that a recording film of the optical information recording medium is formed of a phase-change material.

DETAILED DESCRIPTION OF THE INVENTION

Figure 1:
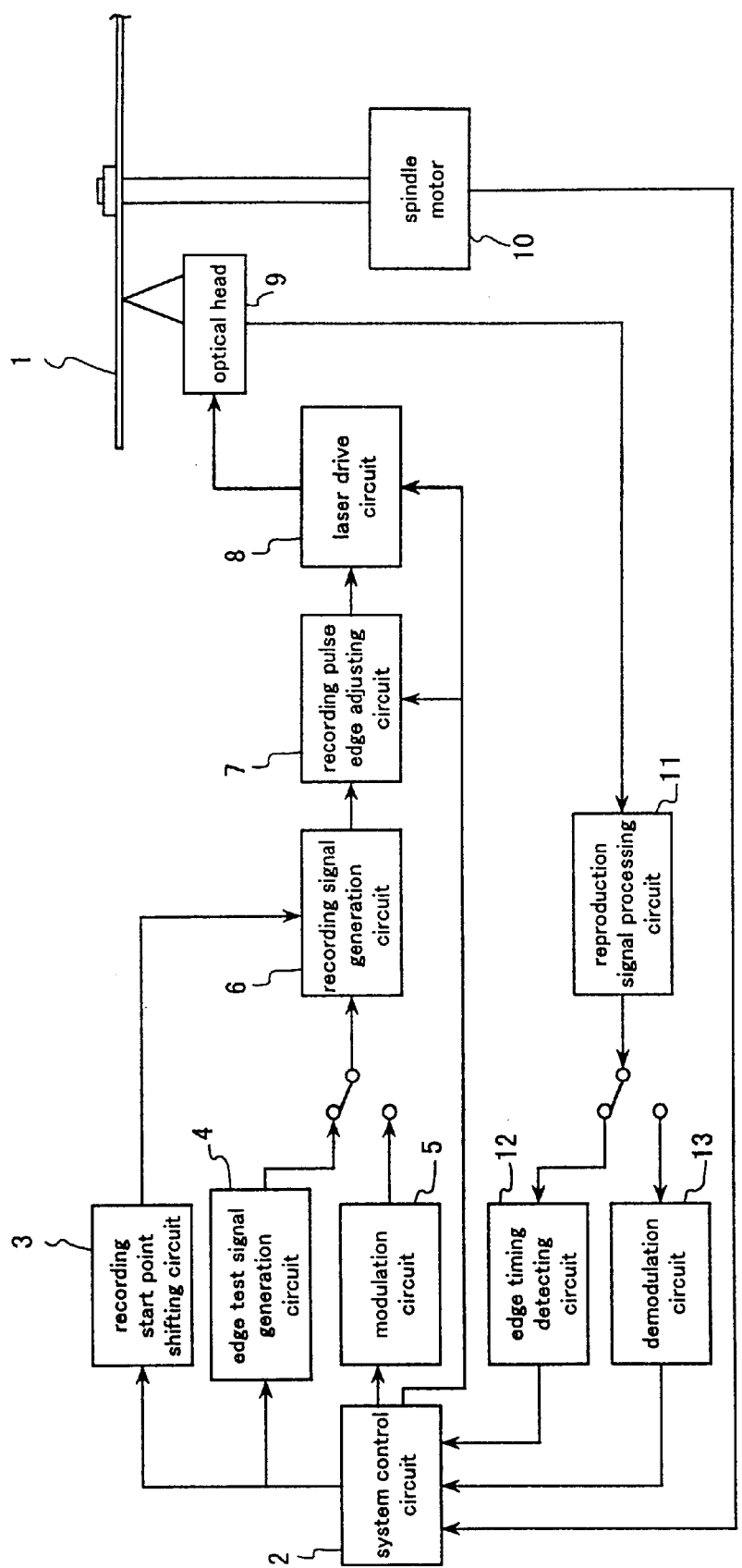
FIG. 1 is a block diagram showing the configuration of recording/reproducing apparatuses according to first and sixth embodiments of the present invention.

Embodiments of the present invention will be explained with reference to the drawings as follows.
First Embodiment FIG. 1 is a block diagram showing the schematic configuration of a recording/reproducing apparatus (an optical information recording apparatus) of a first embodiment according to the present invention.

The recording/reproducing apparatus records and reproduces information using an optical disk 1. The apparatus is provided with a spindle motor 10 for rotating the optical disk 1 and an optical head 9 for focusing a laser beam at a desired spot on the optical disk 1 by using a laser beam source (not shown in the figure). The operation of the whole recording/reproducing apparatus is controlled by a system control circuit 2 (a recording condition determination means). It is preferred to use a phase-change type disk with a recording film made of a phase-change material as the optical disk 1.

In order to record information on the optical disk 1, the recording/reproducing apparatus is provided with a recording start point shifting circuit 3 (a recording start point shifting means) for shifting a recording start point at random in each sector and an edge test signal generation circuit 4 (a test signal generation means) for generating a test signal for determining edge positions of recording pulses.

As a recording means, the recording/reproducing apparatus comprises: a modulation circuit 5 that generates a recording data signal binarized according to an information signal to be recorded; a recording signal generation circuit 6 that generates recording pulses for driving a laser according to the recording data signal; and a recording pulse edge adjusting circuit 7 that adjusts edge positions of the recording pulses output from the recording signal generation circuit 6. Further, a laser drive circuit 8 is provided for modulating a current for driving the laser beam source inside the optical head 9 according to recording pulses output from the recording pulse edge adjusting circuit 7.

In addition, as reproducing means for reproducing information from the optical disk 1, the recording/reproducing apparatus comprises: a reproduction signal processing circuit 11 that carries out waveform process of a reproduction signal based on the light reflected from the optical disk 1; an edge timing detecting circuit 12 that detects timings of edges in the reproduction signal; and a demodulation circuit 13 for obtaining reproduction information.

Figure 2:
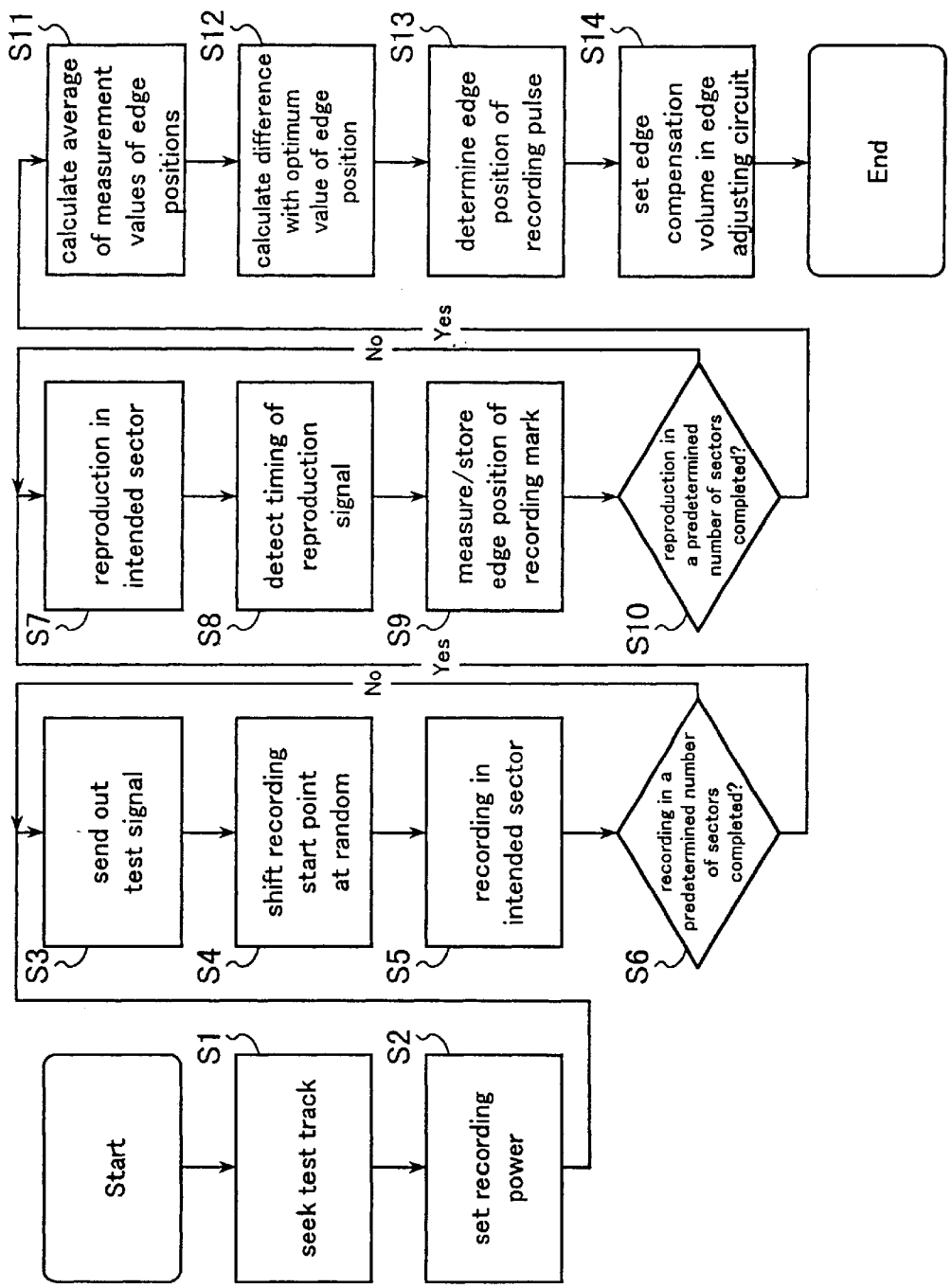
FIG. 2 is a flowchart explaining the operation of the recording/reproducing apparatus according to the first embodiment.

The operation of the recording/reproducing apparatus according to the present embodiment will be explained with reference to the flowchart shown in FIG. 2 as follows.

In test recording, first the optical head 9 seeks a predetermined track on the optical disk 1 (Step 1, hereafter abbreviated such as "S1") and the system control circuit 2 determines a set value of recording power in the laser drive circuit 8 (S2). Then, the edge test signal generation circuit 4 generates a test signal and sends it out to the recording signal generation circuit 6 as a recording data signal (S3).

The recording signal generation circuit 6 detects how many channel clock periods T correspond to an inversion interval (that is, the interval at which inversion takes place) in the recording data signal. Then the circuit 6 generates a predetermined number of recording pulses with predetermined widths in predetermined timings according to the lengths of recording marks.

In this case, the recording start point shifting circuit 3 shifts the start position of a recording gate signal at random in each sector and sends it out to the recording signal generation circuit 6. The recording gate signal is a digital signal of "1" or "0". Only when information is recorded on the optical disk 1, the digital signal is "1". In the case other than that, the digital signal is "0". However, conversely the digital signal may be "0" when information is recorded, and in the case other than that it may be "1".

By the shift of the start position of the recording gate signal at random in this way, the recording start point of a series of recording data signal to be recorded in a sector on the optical disk 1 shifts at random in each sector (S4). Then, the recording pulse edge adjusting circuit 7 inputs recording pulses to the laser drive circuit 8 for driving the laser beam source.

The laser drive circuit 8 modulates a current for driving the laser beam source according to the recording pulses, thus carrying out the recording in the intended sector (S5). The above-mentioned recording operations from S3 to S5 are repeated until the recording is completed in the predetermined number of sectors (Yes at S6).

As a result, even if test signals with the same pattern are overwritten on the same track, the phase relationship between new recording marks and old recording marks varies at random in each sector. Therefore, mark distortions under various states shown in FIGS. 11 to 14 are present with equal probability.

After the recording of test signal, the optical head 9 reproduces the test signal from the sector (S7) and the reproduction signal processing circuit 11 equalizes and binarizes a signal reproduced. Then, the edge timing detecting circuit 12 slices the reproduction signal binarized and detects an inversion interval in the signal (S8), thus measuring an interval between edges of recording marks. The interval between edges thus measured is stored in a memory (not shown in the figures) in the system control circuit 2 (S9). The above-mentioned processes from S7 to S9 are repeated for all the sectors in which the test recording has been carried out (until obtaining Yes at S10).

After that, the system control circuit 2 calculates the average of measured values of intervals between edges that have been stored in the memory (S11). As described above, since the test signal has been recorded while shifting the recording start point of the test signal at random in each sector at S4, the shifts in interval between edges due to the influence of various kinds of mark distortions (i.e. the influence of $\Delta_1$ and $\Delta_2$ in FIGS. 11 to 14) as shown in FIGS. 11 to 14 are averaged. Therefore, in the average value of the intervals between edges calculated at S11, variation caused by the phase relationship with a previous data pattern does not occur. As a result, it is possible to determine an ideal interval between edges in the same state as that when an actual information signal is overwritten.

As a next step, the difference between the interval between edges calculated from the reproduction signal obtained by reproducing a result of the test recording and that in the test signal (for example, in the case of the test signals shown in FIGS. 11 to 14, the difference between 15T and the time corresponding to the interval between edges calculated) is determined (S12). Then, an edge position of a recording pulse (for example, the leading edge of a recording pulse for recording a 3T mark in the examples as shown in FIGS. 11 to 14) is determined to be the position compensated for the above-mentioned difference (S13). The edge compensation volume is set in the recording pulse edge adjusting circuit 7 (S14), thus completing the test recording. After that, when information signals are recorded actually, the recording is carried out according to the edge position of the recording pulse set in the circuit 7. Consequently, recording marks can be formed having ideal edge positions.

As described above, in the present embodiment, the recording start point of the test signal is shifted at random in each sector and test recording is carried out in a plurality of sectors. The average value of intervals between edges of recording marks obtained from the reproduction signals is determined, and thus the test recording for determining edge positions of recording marks precisely without causing variation can be carried out. As a result, information signals can be recorded further precisely.

Second Embodiment

Figure 3:
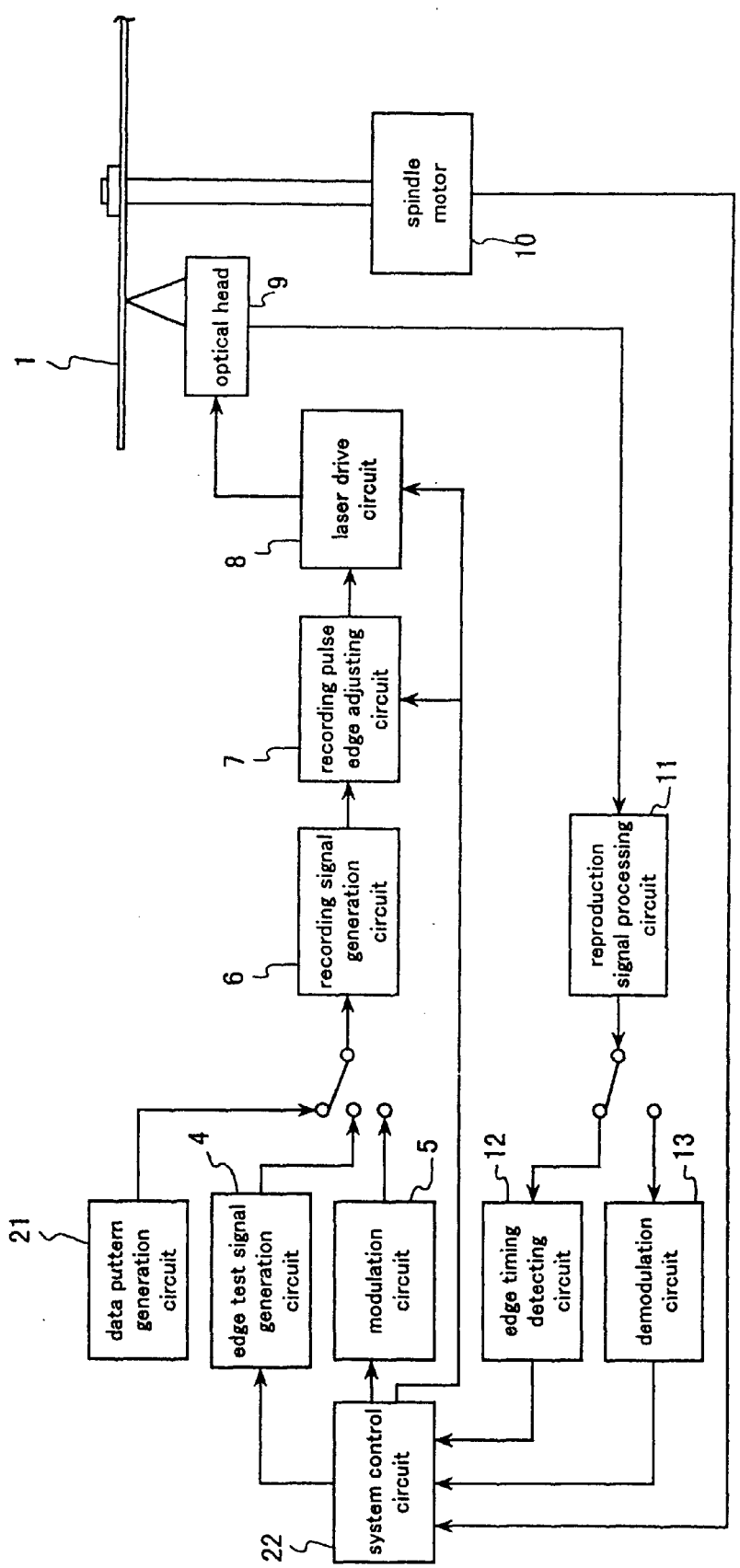
FIG. 3 is a block diagram showing the configuration of a recording/reproducing apparatus according to a second embodiment of the present invention.

FIG. 3 is a block diagram showing the schematic configuration of a recording/reproducing apparatus in a second embodiment of the present invention.

The recording/reproducing apparatus records and reproduces information using an optical disk 1. The apparatus is provided with a spindle motor 10 for rotating the optical disk 1 and an optical head 9 for focusing a laser beam at a desired spot on the optical disk 1 by using a laser beam source (not shown in the figure). The operation of the whole recording/reproducing apparatus is controlled by a system control circuit 22.

As recording means (or recording/erasing means), the recording/reproducing apparatus comprises: an edge test signal generation circuit 4 that generates a test signal for determining edge positions of recording pulses; a modulation circuit 5 that generates a recording data signal binarized according to an information signal to be recorded; a recording signal generation circuit 6 that generates recording pulses for driving a laser according to the recording data signal; and a recording pulse edge adjusting circuit 7 that adjusts edge positions of the recording pulses output from the recording signal generation circuit 6. Further, a laser drive circuit 8 is provided for modulating a current for driving a laser beam source in the optical head 9 according to recording pulses output from the recording pulse edge adjusting circuit 7.

In order to reproduce information from the optical disk 1, the above-mentioned recording/reproducing apparatus also comprises: a reproduction signal processing circuit 11 that carries out waveform process of a reproduction signal based on light reflected from the optical disk 1; an edge timing detecting circuit 12 that detects timings of edges in the reproduction signal; and a demodulation circuit 13 for obtaining reproduction information.

The recording/reproducing apparatus of the present embodiment is provided with a data pattern generation circuit 21 instead of the recording start point shifting circuit 3 in the first embodiment. The circuit 21 generates a data pattern to be recorded before the recording of a test signal on a track on which the test signal is to be recorded. As the data pattern, data having substantially no correlation with the test signal is used.

Figure 4:
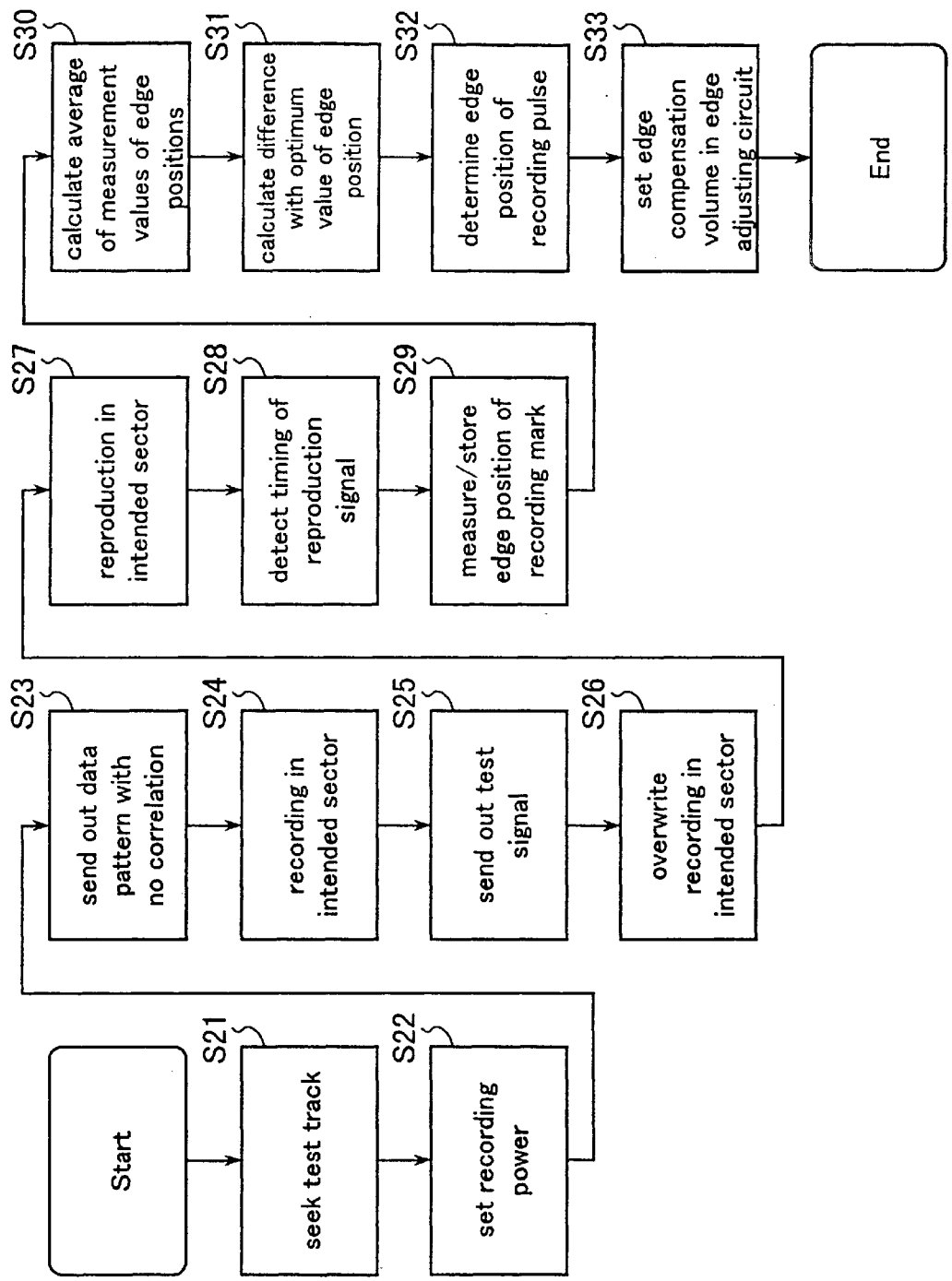
FIG. 4 is a flowchart explaining the operation of the recording/reproducing apparatus according to the second embodiment.

Then, the operation of the recording/reproducing apparatus of the present embodiment controlled by the system control circuit 22 will be explained using the flowchart shown in FIG. 4 as follows.

In test recording, first the optical head 9 seeks a predetermined track on the optical disk 1 (S21) and the system control circuit 22 determines a set value of recording power in the laser drive circuit 8 (S22). Then, the data pattern generation circuit 21 generates a data pattern having substantially no correlation with the pattern of a test signal and sends it out to the recording signal generation circuit 6 as a recording data signal (S23). The recording data signal is converted to recording pulses in the recording signal generation circuit 6 and a current for driving the laser is modulated in the laser drive circuit 8. Thus, the recording data signal is recorded in the sector in which the test recording is to be carried out later (S24).

After that, a test signal is sent out from the edge test signal generation circuit 4 to the recording signal generation circuit 6 as a recording data signal (S25). The recording data signal is converted to recording pulses in the recording signal generation circuit 6 in the same way and a current for driving the laser is modulated in the laser drive circuit 8. Then, the recording data signal is overwritten in the sector in which the data pattern sent out from the data pattern generation circuit 21 has been recorded at S24 (S26).

In this case, the data pattern that has been recorded at S24 before the overwriting at S26 has substantially no correlation with the pattern of the test signal. Therefore, the recording marks formed based on the test signal and previous recording marks overlap in random conditions. Thus, various kinds of mark distortions shown in FIGS. 11 to 14 are present at equal probabilities.

After the recording of the test signal, the optical head 9 reproduces the signal in the sector in which overwriting has been carried out at S26 (S27) and the reproduction signal processing circuit 11 equalizes and binarizes a signal reproduced. Then, the edge timing detecting circuit 12 slices the binarized signal and detects the inversion interval in the signal (S28), thus measuring an interval between edges of the recording marks. The interval between edges thus measured is stored in a memory in the system control circuit 22 (S29).

Then, the system control circuit 22 calculates the average of measured values of intervals between edges (S30). As described above, since the data pattern that has been recorded before the overwriting has substantially no correlation with the pattern of the test signal, the shifts in interval between edges due to the influence of various kinds of mark distortions (i.e. the influence of $\Delta_1$ and $\Delta_2$ in FIGS. 11 to 14 shown in FIGS. 11 to 14 are averaged. Therefore, in the value of the interval calculated, the variation caused by the phase relationship with the previous data pattern does not occur. As a result, it is possible to determine a precise interval between edges of the recording marks.

As a next step, the difference between the interval calculated from the reproduction signal of the test signal that has been recorded in the test recording and an original interval between edges of the test signal (for example, in the case of the test signals shown in FIGS. 11 to 14, the difference between 15T and the time corresponding to the interval between edges calculated) is determined (S31). Then, an edge position of a recording pulse (for example, the leading edge of the recording pulse for recording a 3T mark in the examples as shown in FIGS. 11 to 14) is determined to be the position compensated for the above-mentioned difference (S32). The edge compensation volume is set in the recording pulse edge adjusting circuit 7 (S33), thus completing the test recording. After that, when information signals are recorded actually, the information signals are recorded by applying the edge position of the recording pulse set in the circuit 7. Consequently, recording marks can be formed with ideal edge positions.

As described above, in the present embodiment, before the test recording the data pattern having substantially no correlation with the pattern of the test signal is recorded on a track on which the test signal is to be recorded. This permits the test recording for determining edge positions of recording marks precisely without causing variation. As a result, information signals can be recorded further precisely.

In the present embodiment, when further using the configuration and method for recording and reproducing a test signal in a plurality of sectors by providing the recording start point shifting circuit 3 that shifts the recording start point at random as described in the first embodiment, the correlation between the data pattern before the test recording and the data pattern of the test signal is further decreased. Therefore, this is further preferable in that edge positions of recording pulses can be determined more precisely.

In the present embodiment, the data pattern to be recorded before the recording of the test signal was defined as a pattern having substantially no correlation with that of the test signal. However, a random pattern may be used as the data pattern. In this case, when random recording information is given to the system control circuit 22 beforehand and the recording information is modulated in the modulation circuit 5, the data pattern generation circuit 21 can be omitted, which is further preferable in that the configuration of the recording/reproducing apparatus can be simplified. Alternatively, when random recording information is sent to the system control circuit 22 from an external unit (for example, a computer) connected to the recording/reproducing apparatus and the recording information is modulated in the modulation circuit 5, the same effect can be obtained.

The data pattern to be recorded before the recording of the test signal that has substantially no correlation with that of the test signal may be a data pattern of another test signal with a different pattern cycle. Similarly in this case, the data pattern generation circuit 21 can be omitted and thus the configuration of the recording/reproducing apparatus is simplified, which is further preferable.

Instead of the recording of the data pattern to be recorded before the recording of the test signal that has substantially no correlation with that of the test signal, all the signals that have been recorded on a track on which the test signal is to be recorded may be erased by the irradiation of a laser beam onto the optical disk 1 with a constant level of erase power ($P_b$). When the optical disk 1 is a phase-change type optical disk, a region of a recording film irradiated continuously with the laser beam having the erase power $P_b$ turns into a crystalline condition, thus erasing information that has been recorded. Similarly in this case, the data pattern generation circuit 21 can be omitted, which is further preferable in that the recording/reproducing apparatus can be simplified.

Third Embodiment

Figure 5:
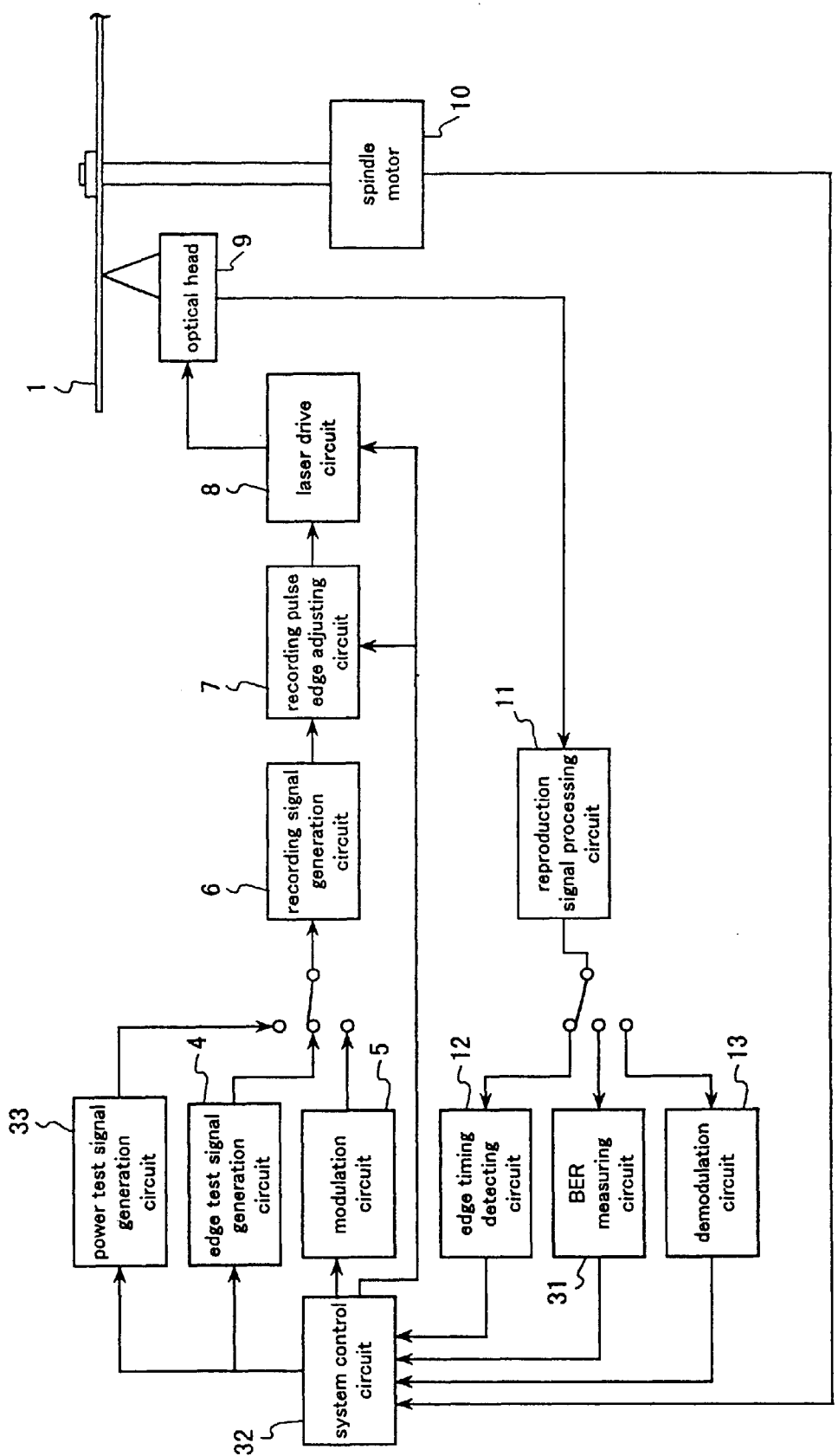
FIG. 5 is a block diagram showing the configuration of recording/reproducing apparatuses according to third and fourth embodiments of the present invention.

FIG. 5 is a block diagram showing the schematic configuration of a recording/reproducing apparatus in a third embodiment of the present invention.

The recording/reproducing apparatus records and reproduces information using an optical disk 1. The apparatus is provided with a spindle motor 10 for rotating the optical disk 1 and an optical head 9 for focusing a laser beam at a desired spot on the optical disk 1 by using a laser beam source (not shown in the figure). The operation of the whole recording/reproducing apparatus is controlled by a system control circuit 32.

The recording/reproducing apparatus comprises: an edge test signal generation circuit 4 that generates a test signal for determining edge positions of recording pulses (an edge test signal); a modulation circuit 5 that generates a binarized recording data signal according to an information signal to be recorded; a recording signal generation circuit 6 that generates recording pulses for driving a laser according to the recording data signal; and a recording pulse edge adjusting circuit 7 that adjusts edge positions of the recording pulses output from the recording signal generation circuit 6. Further, a laser drive circuit 8 is provided for modulating a current for driving a laser beam source in the optical head 9 according to recording pulses output from the recording pulse edge adjusting circuit 7.

In order to reproduce information from the optical disk 1, the above-mentioned recording/reproducing apparatus also comprises: a reproduction signal processing circuit 11 that carries out waveform process of a reproduction signal based on light reflected from the optical disk 1; an edge timing detecting circuit 12 that detects timings of edges in the reproduction signal; and a demodulation circuit 13 for obtaining reproduction information.

The configuration described above is substantially the same as that shown in FIG. 1 in the first embodiment. The recording/reproducing apparatus of the present embodiment is different from that of the first embodiment particularly in omitting the recording start point shifting circuit 3 and comprising a bit error rate (abbreviated as "BER" in the figure) measuring circuit 31 that determines recording power and a power test signal generation circuit 33 that generates a test signal for determining the recording power (a power test signal).

Figure 6:
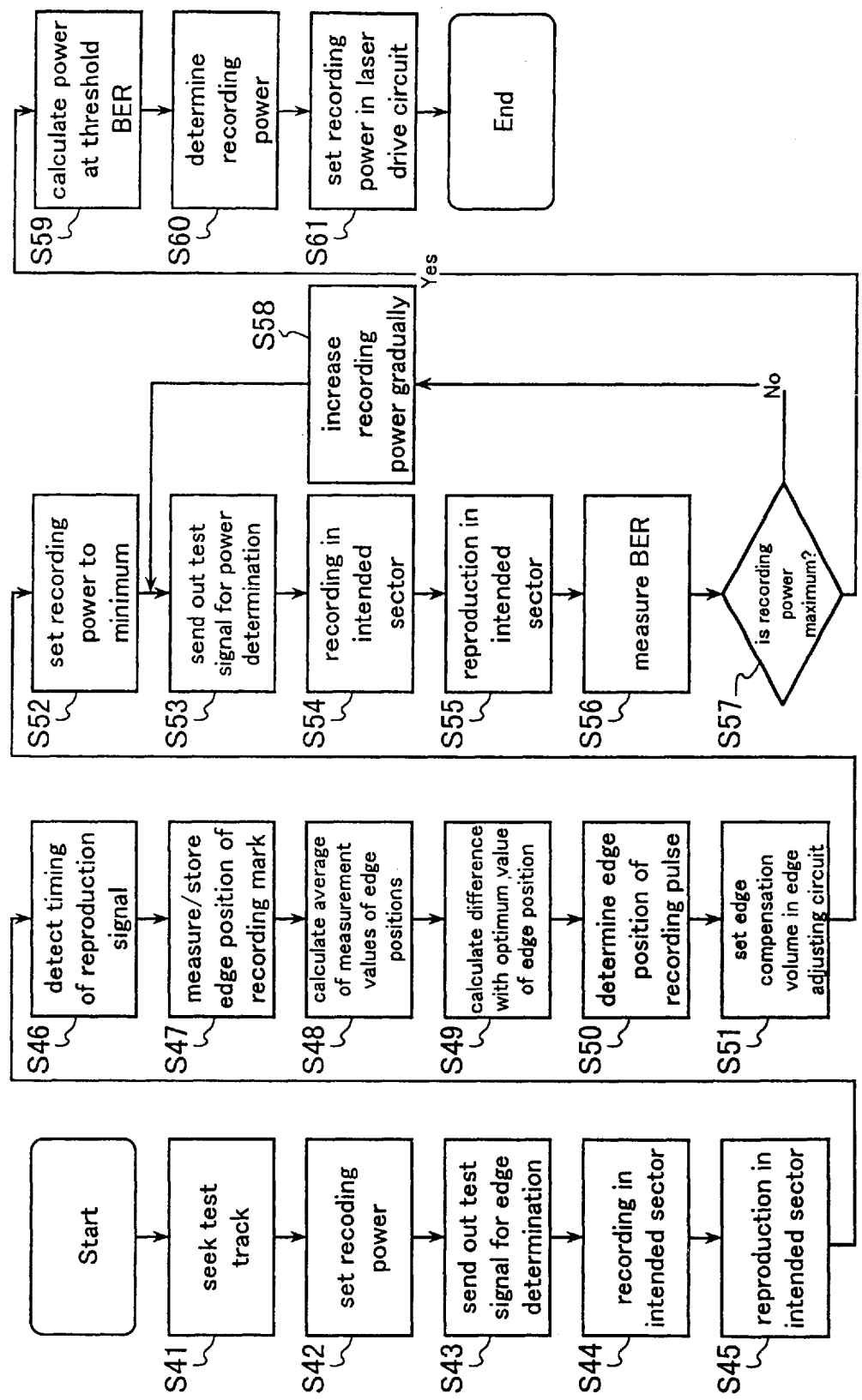
FIG. 6 is a flowchart explaining the operation of the recording/reproducing apparatus according to the third embodiment.

The operation of the recording/reproducing apparatus of the present embodiment controlled by the system control circuit 32 will be explained using the flowchart shown in FIG. 6 as follows.

In test recording, first the optical head 9 seeks a predetermined track on the optical disk 1 (S41) and a set value of recording power in the laser drive circuit 8 is set to an initial value by the system control circuit 32 (S42). Then, a test signal for determining edge positions of recording pulses (an edge test signal) is sent out from the edge test signal generation circuit 4 to the recording signal generation circuit 6 as a recording data signal (S43). The recording signal generation circuit 6 converts the recording data signal to recording pulses and the laser drive circuit 8 modulates a current for driving the laser based on the recording pulses, thus carrying out the recording in a sector intended for the test recording (S44).

After the recording of the test signal, the test signal in the sector in which the recording has been carried out at S44 is reproduced by the optical head 9 (S45) and the reproduction signal processing circuit 11 equalizes and binarizes a reproduction signal. Then, the edge timing detecting circuit 12 slices the binarized signal and detects an inversion interval in the signal (S46), thus measuring the interval between edges of recording marks. The measured value is stored in a memory in the system control circuit 32 (S47).

After that, the system control circuit 32 (a first recording condition determination means) calculates the average of the measured values of intervals between edges (S48). Then, the difference between the interval between edges calculated from the reproduction signal of the test signal that has been recorded in the test recording and an original interval between edges of the test signal (for example, in the case of the test signals shown in FIGS. 11 to 14, the difference between 15T and the time corresponding to the interval between edges calculated) is determined (S49: a comparison means). Then, an edge position of a recording pulse (for example, the leading edge of a recording pulse for recording a 3T mark in examples as shown in FIGS. 11 to 14) is determined to be the position compensated for the above-mentioned difference (S50). The edge compensation volume is set in the recording pulse edge adjusting circuit 7 (S51).

As a next step, the recording power is set to be the minimum within a power adjustable range (S52) and a power test signal generation circuit 33 sends out a test signal for determining power (a power test signal) to the recording signal generation circuit 6 (S53). Then, based on the recording pulses generated from the test signal, the test signal is recorded in the sector intended for the test recording (S54). After that, the test signal recorded is reproduced (S55) and then is equalized, binarized, and the like in the reproduction signal processing circuit 11.

The bit error rate measuring circuit (a measuring means) 31 measures a bit error rate by comparing the pattern of the test signal and the data pattern reproduced (S56) and stores the measured value in the system control circuit 32. Until the recording power reaches the maximum within the adjustable range (Yes at S57), the recording power is increased gradually (S58) and the above-mentioned steps from S53 to S56 are repeated.

Figure 15:
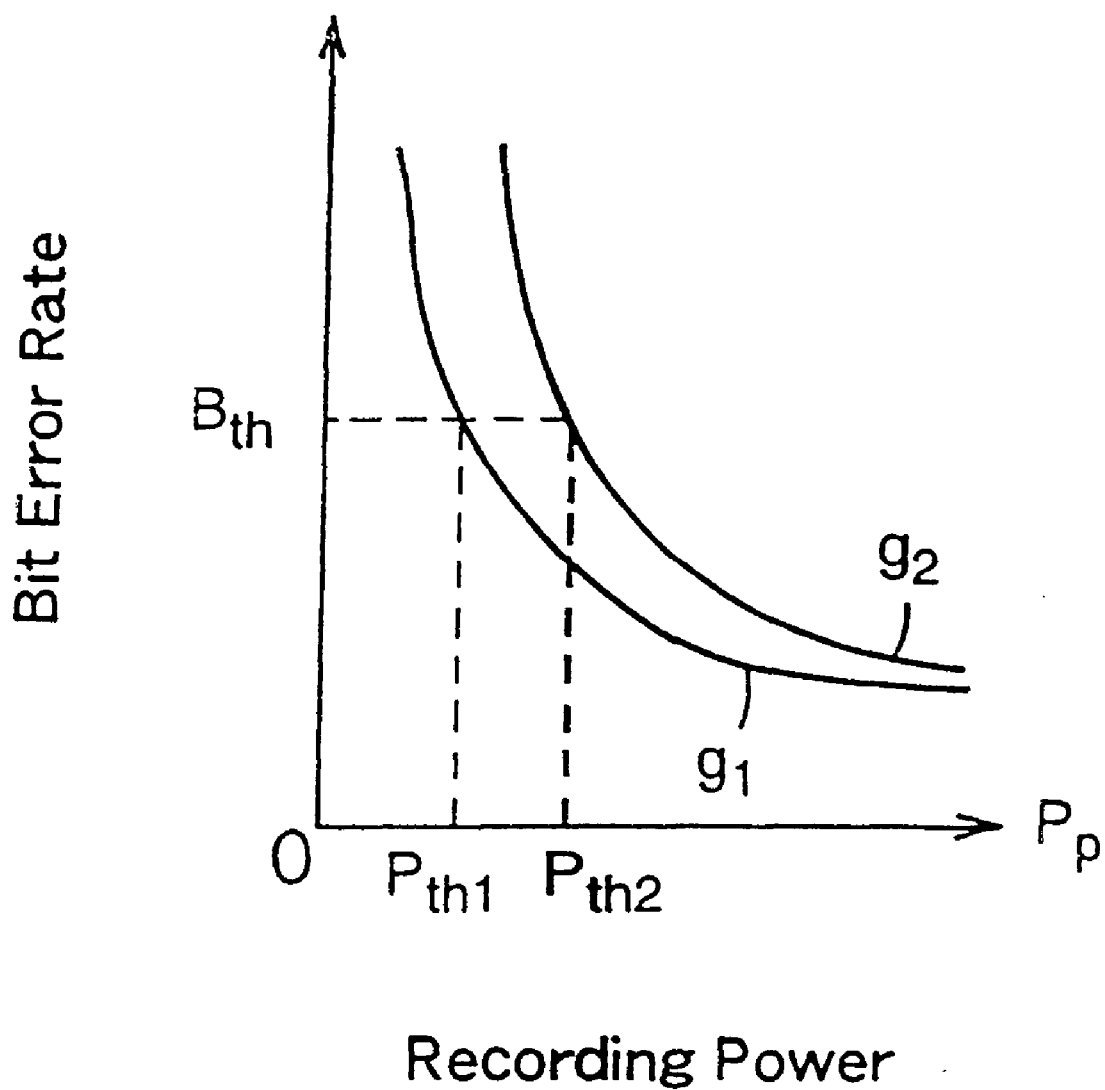
FIG. 15 is a graph showing the relationship between a recording peak power $P_p$ and a bit error rate when a periodic signal of a shortest mark is recorded while varying a recording pulse width in a conventional optical disk.

Then, the system control circuit (a second recording condition determination means) 32 refers to the measured values stored in the memory and calculates the recording power value that allows the bit error rate to be a certain threshold ($B_{th}$ in FIG. 15) (S59). Based on the value, by carrying out processes of, for example, multiplying the value by a certain coefficient and the like, a proper value of the recording power is determined (S60) and the recording power is set to the proper value in the laser drive circuit 8 (S61), thus completing the test recording. According to this method, even when pulse width is changed by the adjustment of edge positions of recording pulses, an information signal can be recorded with an optimum recording power.

As described above, in the present embodiment, after the test recording for determining an optimum value for edge positions of recording pulses, the test recording for determining an optimum value of the recording power is carried out with the edge positions of recording pulses being set to the above-mentioned optimum value. Therefore, even when pulse width is changed by the adjustment of edge positions of recording pulses, the recording power can be optimized. Consequently, an information signal can be recorded with the optimum edge positions and recording power, thus obtaining an excellent effect in that the information signal can be recorded further precisely.

In the present embodiment, the recording power when the edge positions are determined was set to a predetermined value at S42. However, when a step of carrying out the test recording for determining the recording power value is added before S42, the optimum edge positions of recording pulses and the optimum recording power can be determined further precisely, which is more preferable.

Moreover, when the configuration and method as described in the first embodiment in which the recording start point shifting circuit 3 is provided, the recording start point is shifted at random and a test signal is recorded and reproduced in a plurality of sectors to determine the optimum edge positions of recording pulses also are used additionally in the present embodiment, the test recording for determining edge positions of recording marks precisely without causing variation can be carried out, which is more preferable.

In addition, when the configuration and method as described in the second embodiment in which the data pattern generation circuit 21 is provided and a data pattern having substantially no correlation with the pattern of a test signal is recorded beforehand on a track on which the test signal for determining edge positions of recording pulses is to be recorded also are used additionally, the test recording for determining edge positions of recording marks precisely without causing variation can be carried out, which is more preferable.

Further, when the configuration and method as described later in a fifth embodiment in which a polarity inversion control circuit 53, a polarity inverting circuit 54, and a select circuit 55 are provided and random polarity inversion of a recording data signal is inhibited only when the test signal for determining edge positions of recording pulses is recorded also are used additionally, the number of times the optical disk can be rewritten increases and information signals can be recorded precisely, which is further preferable.

Fourth Embodiment

The configuration of the recording/reproducing apparatus in a fourth embodiment of the present invention is the same as that shown in FIG. 5 in the third embodiment. However, the control by the system control circuit 32 is different.

Figure 7:
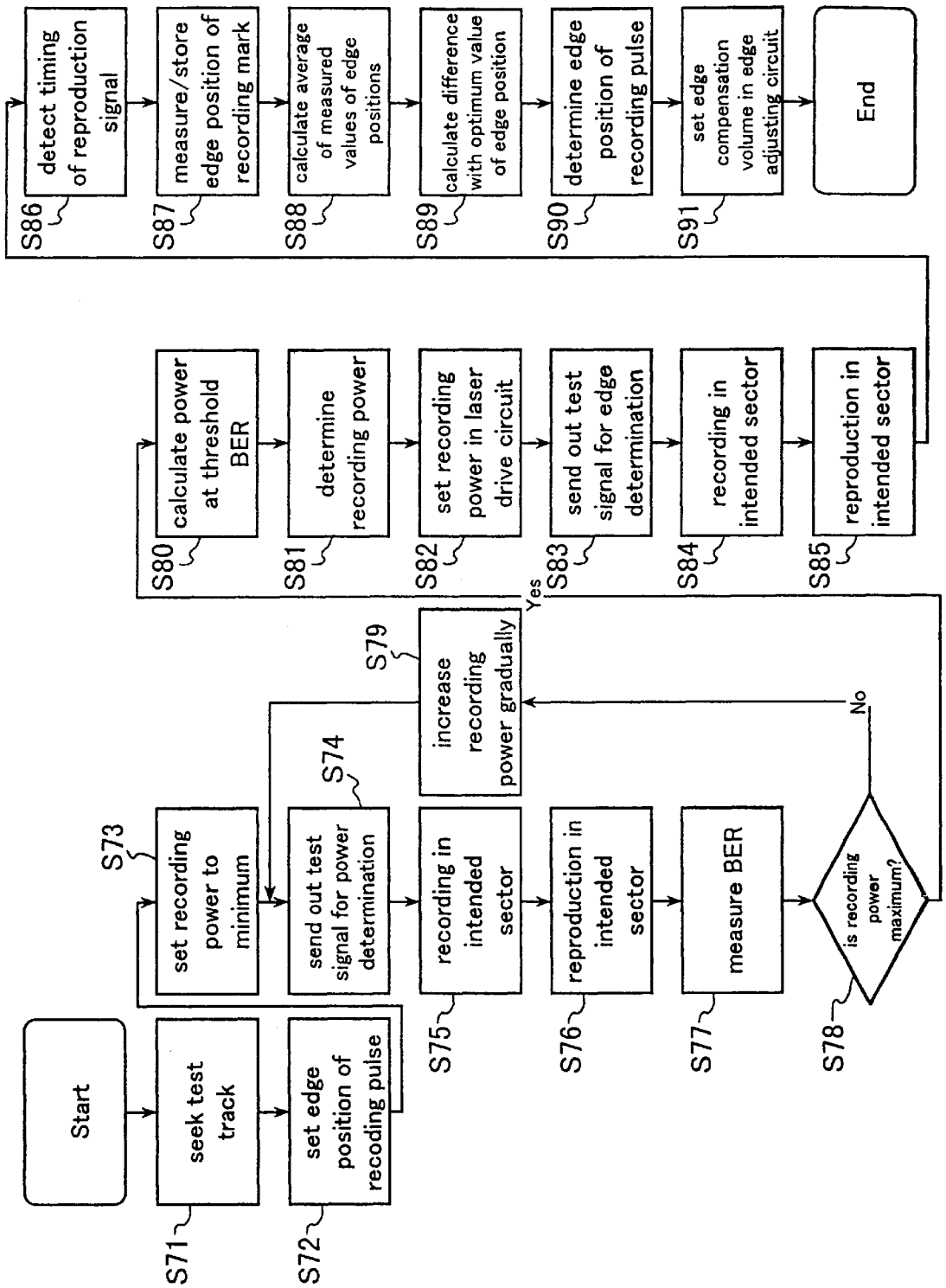
FIG. 7 is a flowchart explaining the operation of the recording/reproducing apparatus according to the fourth embodiment.

The operation of the recording/reproducing apparatus according to the present embodiment that is controlled by the system control circuit 32 will be explained using FIG. 5 and the flowchart in FIG. 7.

In test recording, first the optical head 9 seeks a predetermined track on the optical disk 1 (S71) and the system control circuit 32 sets an edge position of a recording pulse in the recording pulse edge adjusting circuit 7 to a predetermined position (S72).

Then, the recording power is set to the minimum within a power adjustable range (S73) and a test signal for determining power (a power test signal) is sent out from the power test signal generation circuit 33 to the recording signal generation circuit 6 (S74), thus recording the test signal in a sector intended for the test recording (S75).

As a next step, the test signal recorded is reproduced (S76) and then is equalized, binarized, and the like in the reproduction signal processing circuit 11. The bit error rate measuring circuit (a measuring means) 31 measures a bit error rate by comparing the pattern of the test signal and a data pattern reproduced (S77) and stores the measured value in the system control circuit 32. Until the recording power reaches the maximum within the adjustable range (Yes at S78), the recording power is increased gradually (S79) and the above-mentioned processes from S74 to S77 are repeated.

Then, based on measured values stored, the system control circuit (a second recording condition determination means) 32 calculates the power that allows the bit error rate to be a certain threshold ($B_{th}$ in FIG. 15) (S80). Based on the power, the recording power is determined (S81) and then is set in the laser drive circuit 8 (S82).

As a next step, a test signal for determining edge positions of recording pulses (an edge test signal) is sent out from the edge test signal generation circuit 4 to the recording signal generation circuit 6 as a recording data signal (S83). The recording signal generation circuit 6 converts the recording data signal to recording pulses. The laser drive circuit 8 modulates a current for driving the laser based on the recording pulses from the recording signal generation circuit 6, thus recording the test signal in the sector intended for the test recording (S84).

After the recording of the test signal, the test signal is reproduced with the optical head 9 from the sector in which the test recording has been carried out (S85). The reproduction signal processing circuit 11 equalizes and binarizes a reproduction signal. Then, the edge timing detecting circuit 12 slices the binarized signal and detects an inversion interval in the signal (S86), thus measuring an interval between edges of recording marks. The measured value is stored in a memory in the system control circuit 32 (S87).

After that, the system control circuit (a first recording condition determination means) 32 calculates the average of measured values of intervals between edges stored in the memory (S88). Then, the difference between the interval between edges calculated from the reproduction signal of the test signal that has been recorded in the test recording and an original interval between edges in the test signal (for example, in the case of the test signals shown in FIGS. 11 to 14, the difference between 15T and the time corresponding to the interval between edges calculated) is determined (S89: a comparison means). Then, an edge position of a recording pulse (for example, the leading edge of a recording pulse for recording a 3T mark in examples as shown in FIGS. 11 to 14) is determined to be the position compensated for the above-mentioned difference (S90). The edge compensation volume is set in the recording pulse edge adjusting circuit 7 (S91), thus completing the test recording. According to the present method, even when the recording power is adjusted, information signals can be recorded with optimum edge positions of recording pulses.

As described above, in the present embodiment, after the test recording for determining a proper value of the recording power, the test recording for determining edge positions of recording pulses is carried out with the recording power being set to the above-mentioned proper value. This enables information signals to be recorded with optimum edge positions of recording pulses, even when irradiation energy of a laser beam is changed due to the adjustment of the recording power. As a result, an excellent effect in that information signals can be recorded further precisely can be obtained.

In the present embodiment, the edge position in determining the recording power was set to a predetermined value at S72. However, when a step of carrying out the test recording for determining the edge position is added before S72, optimum edge positions of recording pulses and optimum recording power can be determined further precisely, which is more preferable.

Moreover, when the configuration and method as described in the first embodiment in which the recording start point shifting circuit 3 is provided, the recording start point is shifted at random and a test signal is recorded and reproduced in a plurality of sectors to determine the optimum edge positions of recording pulses also are used additionally in the present embodiment, the test recording for determining edge positions of recording marks precisely without causing variation can be carried out, which is more preferable.

In addition, when the configuration and method as described in the second embodiment in which the data pattern generation circuit 21 is provided and a data pattern having substantially no correlation with the pattern of a test signal is recorded beforehand on a track on which the test signal for determining edge positions of recording pulses is to be recorded also are used additionally, the test recording for determining edge positions of recording marks precisely without causing variation can be carried out, which is more preferable.

Further, when the configuration and method as described later in a fifth embodiment in which a polarity inversion control circuit 53, a polarity inverting circuit 54, and a select circuit 55 are provided and random polarity inversion of a recording data signal is inhibited only when the test signal for determining edge positions of recording pulses is recorded also are used additionally, the number of times the optical disk can be rewritten increases and information signals can be recorded precisely, which is further preferable.

When the test recording for determining the optimum recording power and the optimum edge positions of recording pulses is carried out, the configuration and method to be used may be selected from those in the present embodiment and those in the aforementioned third embodiment according to the configuration, recording density, modulation system, or the like of the optical disk on which the test recording is carried out. For example, in the case of an optical disk in which the change in jitter or bit error rate is sensitive to the shift in edge positions, the present embodiment is preferred. On the other hand, in the case of an optical disk in which the change in jitter or bit error rate is sensitive to the change in recording power, the third embodiment is preferred.

Generally, the configuration of the recording/reproducing apparatus required for the test recording for determining edge positions of recording marks is more complex than that required for the test recording for determining recording power. Therefore, when the test recording for determining edge positions is carried out using an external measuring instrument such as, for example, a time interval analyzer, for instance, in adjusting the recording/reproducing apparatus (before shipping) and after that only the test recording for determining recording power is carried out, the third embodiment is preferred in that the configuration of the recording/reproducing apparatus can be simplified.

Fifth Embodiment

Figure 8:
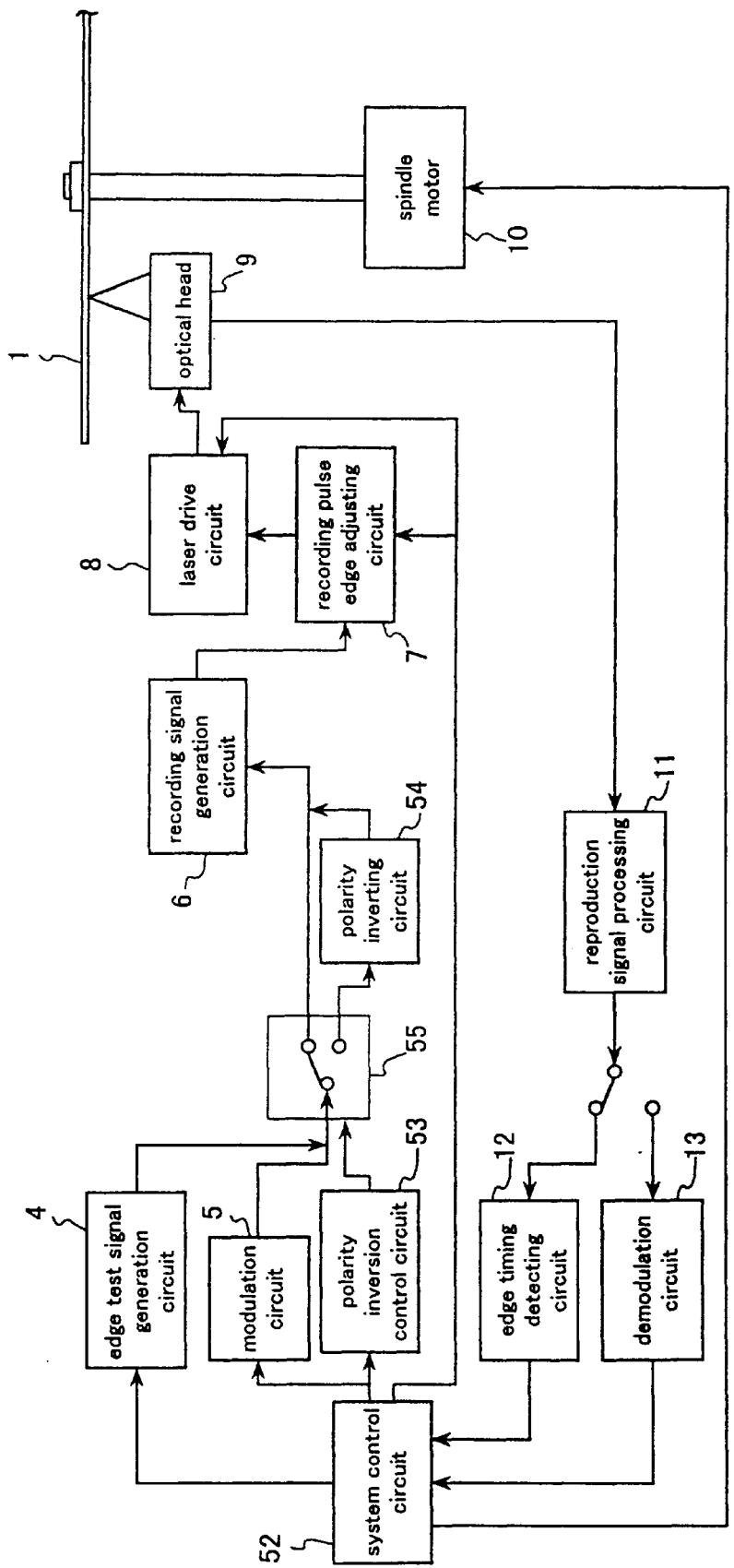
FIG. 8 is a block diagram showing the configuration of a recording/reproducing apparatus according to a fifth embodiment of the present invention.

FIG. 8 is a block diagram showing the schematic configuration of a recording/reproducing apparatus in a fifth embodiment of the present invention.

This recording/reproducing apparatus records and reproduces information using an optical disk 1. The apparatus is provided with a spindle motor 10 for rotating the optical disk 1 and an optical head 9 for focusing a laser beam at a desired spot on the optical disk 1 by using a laser beam source (not shown in the figure). The operation of the whole recording/reproducing apparatus is controlled by a system control circuit 52.

The recording/reproducing apparatus comprises: an edge test signal generation circuit 4 that generates a test signal for test recording; a modulation circuit 5 that generates a recording data signal binarized according to an information signal to be recorded; a recording signal generation circuit 6 that generates recording pulses for driving a laser according to the recording data signal; and a recording pulse edge adjusting circuit 7 that adjusts edge positions of the recording pulses output from the recording signal generation circuit 6. Further, a laser drive circuit 8 is provided for modulating a current for driving a laser beam source (not shown in the figure) in the optical head 9 according to recording pulses output from the recording pulse edge adjusting circuit 7.

In order to reproduce information from the optical disk 1, the above-mentioned recording/reproducing apparatus also comprises: a reproduction signal processing circuit 11 that carries out waveform process of a reproduction signal based on light reflected from the optical disk 1; an edge timing detecting circuit 12 that detects timings of edges in the reproduction signal; and a demodulation circuit 13 for obtaining reproduction information.

The above-mentioned recording/reproducing apparatus further comprises: a polarity inverting circuit 54 that inverts the polarity of a recording data signal; a select circuit 55 containing a switch that switches the output address of the signal sent out from the modulation circuit 5 or the edge test signal generation circuit 4 to either the recording signal generation circuit 6 or the polarity inverting circuit 54; and a polarity inversion control circuit 53 that inhibits random polarity inversion and cancels the inhibition.

Figure 9:
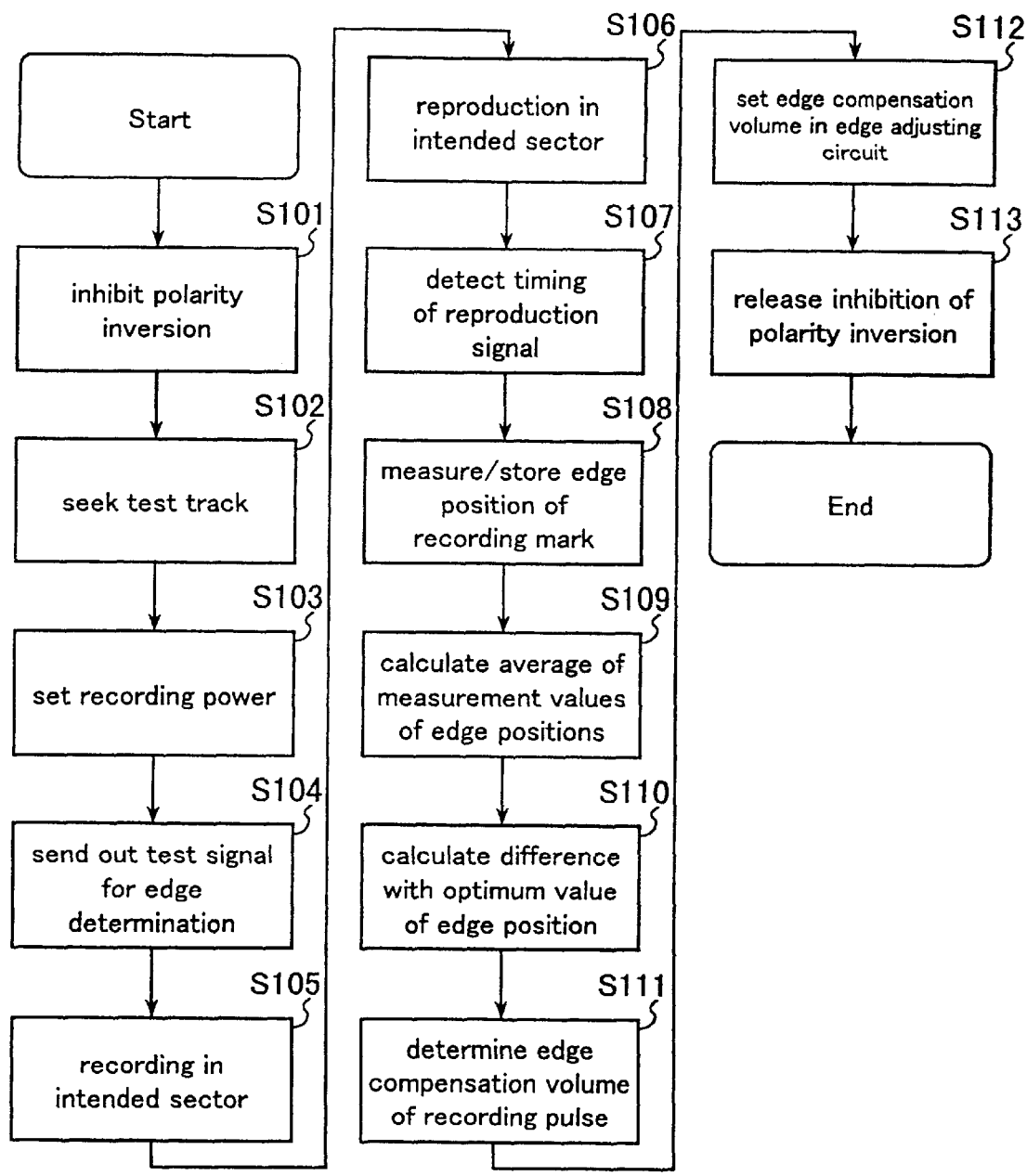
FIG. 9 is a flowchart explaining the operation of the recording/reproducing apparatus according to the fifth embodiment.

The operation of the recording/reproducing apparatus of the present embodiment will be explained using the flowchart shown in FIG. 9 as follows.

In test recording, first the polarity inversion control circuit 53 controls the select circuit 55 so as to fix the output address of the signals output from the select circuit 55 to the recording signal generation circuit 6, so that all the data from the edge test signal generation circuit 4 does not go through the polarity inverting circuit 54 (S105). Thus, the polarity inversion in recording data signal is inhibited.

As a next step, the optical head 9 seeks a predetermined track on the optical disk 1 (S102) and the system control circuit 52 sets the recording power in the laser drive circuit 8 to a predetermined value (S103). Then, the edge test signal generation circuit 4 sends out a test signal to the select circuit 55 as a recording data signal (S104). In this case, since the output address of the select circuit 55 has been switched to the recording signal generation circuit 6 at S101, all the test signals sent out from the edge test signal generation circuit 4 are input to the recording signal generation circuit 6 without going through the polarity inverting circuit 54.

As in the aforementioned embodiments, the recording signal generation circuit 6 converts the test signal input to recording pulses for driving the laser. The laser drive circuit 8 modulates a current for driving the laser based on the recording pulses, thus recording the test signal in the sector intended for the test recording (S105).

After the recording of the test signal, the test signal in the sector in which the test recording has been carried out is reproduced with the optical head 9 (S106) and the reproduction signal processing circuit 11 equalizes and binarizes a reproduction signal. Then, the edge timing detecting circuit 12 slices the binarized signal and detects an inversion interval in the signal (S107). Based on the inversion interval detected, the system control circuit 52 measures an interval between edges of recording marks and stores the measured value in a memory in the system control circuit 52 (S108).

Then, the system control circuit (a recording condition determination means) 52 calculates the average of measured values of intervals between edges that have been stored in the memory (S109). The system control circuit 52 determines the difference between the interval calculated at S109 and an original interval between edges in the test signal (for example, in the case of the test signals shown in FIGS. 11 to 14, the difference between 15T and the time corresponding to the interval calculated) (S110: a comparison means). Then, an edge position of a recording pulse (for example, the leading edge of a recording pulse for recording a 3T mark in examples as shown in FIGS. 11 to 14) is determined to be the position compensated for the above-mentioned difference (S111). The edge compensation volume is set in the recording pulse edge adjusting circuit 7 (S112).

As the last step, the polarity inversion control circuit 53 cancels the inhibition for polarity inversion that has been set at 101 (S113) so that the switch in the select circuit 55 can be switched at random in each sector, thus completing the test recording.

When information signals actually are recorded after the test recording, the switch in the select circuit 55 is switched at random in each sector. Thus, the condition of the information signal is selected from an inverted condition and a non-inverted condition at random for each sector. The inverted condition is obtained when the information signal is sent out to the recording signal generation circuit 6 while being inverted by going through the polarity inverting circuit 54 from the modulation circuit 5. The non-inverted condition is obtained when the information signal is sent out to the recording signal generation circuit 6 directly from the modulation circuit 5 without going through the polarity inverting circuit 54. As a result, even when similar information signals are recorded in the same sector repeatedly, the damage to the specific portion of a recording film of the optical disk 1 can be avoided.

As described above, in the present embodiment, by the control for inhibiting random polarity inversion in a recording data signal only when the test recording is carried out, a leading edge and a rear edge of each recording mark can be distinguished in determining edge positions of recording marks, thus enabling information signals to be recorded precisely. In addition, when information signals actually are recorded, the polarity of the recording data signal is controlled to be inverted at random in each sector or at each time overwriting is carried out, thus obtaining an excellent effect in that the number of times the optical disk can be rewritten can be increased.

In contrast to the above, at S101, the polarity inversion control circuit 53 may control the switching of the switch in the select circuit 55 so that all the test signals sent out from the edge test signal generation circuit 4 are sent to the polarity inverting circuit 54 and thus their polarity is inverted. In short, what is required is that the polarity of the recording data signal is constant at all times throughout a series of test recording.

In the present embodiment, the edge test signal generation circuit 4 was provided and the configuration and method for determining optimum edge positions of recording pulses by the test recording were explained. However, as in the third embodiment, the power test signal generation circuit (the second test signal generation means) 33 may be further provided, and the configuration and method in which the system control circuit (a second recording condition determination means) 52 determines recording power also may be employed additionally. In this case, it is preferred to control the select circuit to cancel the inhibition of polarity inversion in a process for determining recording power for the following reason. Since there is a high possibility that the test recording for determining recording power is carried out with a higher recording power than that used in the test recording for determining edge positions of recording pulses or in the normal recording of information signals, polarity inversion suppresses the deterioration of a recording film when recording is carried out on a test track repeatedly.

Moreover, when the configuration and method as described in the first embodiment in which the recording start point shifting circuit 3 is provided, the recording start point is shifted at random and a test signal is recorded and reproduced in a plurality of sectors to determine the optimum edge positions of recording pulses also are used additionally in the present embodiment, the test recording for determining edge positions of recording marks precisely without causing variation can be carried out, which is more preferable.

In addition, when the configuration and method as described in the second embodiment in which the data pattern generation circuit 21 is provided and a data pattern having substantially no correlation with the pattern of a test signal is recorded beforehand on a track on which the test signal for determining edge positions of recording pulses is to be recorded also are used additionally, the test recording for determining edge positions of recording marks precisely without causing variation can be carried out, which is more preferable.

Sixth Embodiment

Figure 10:
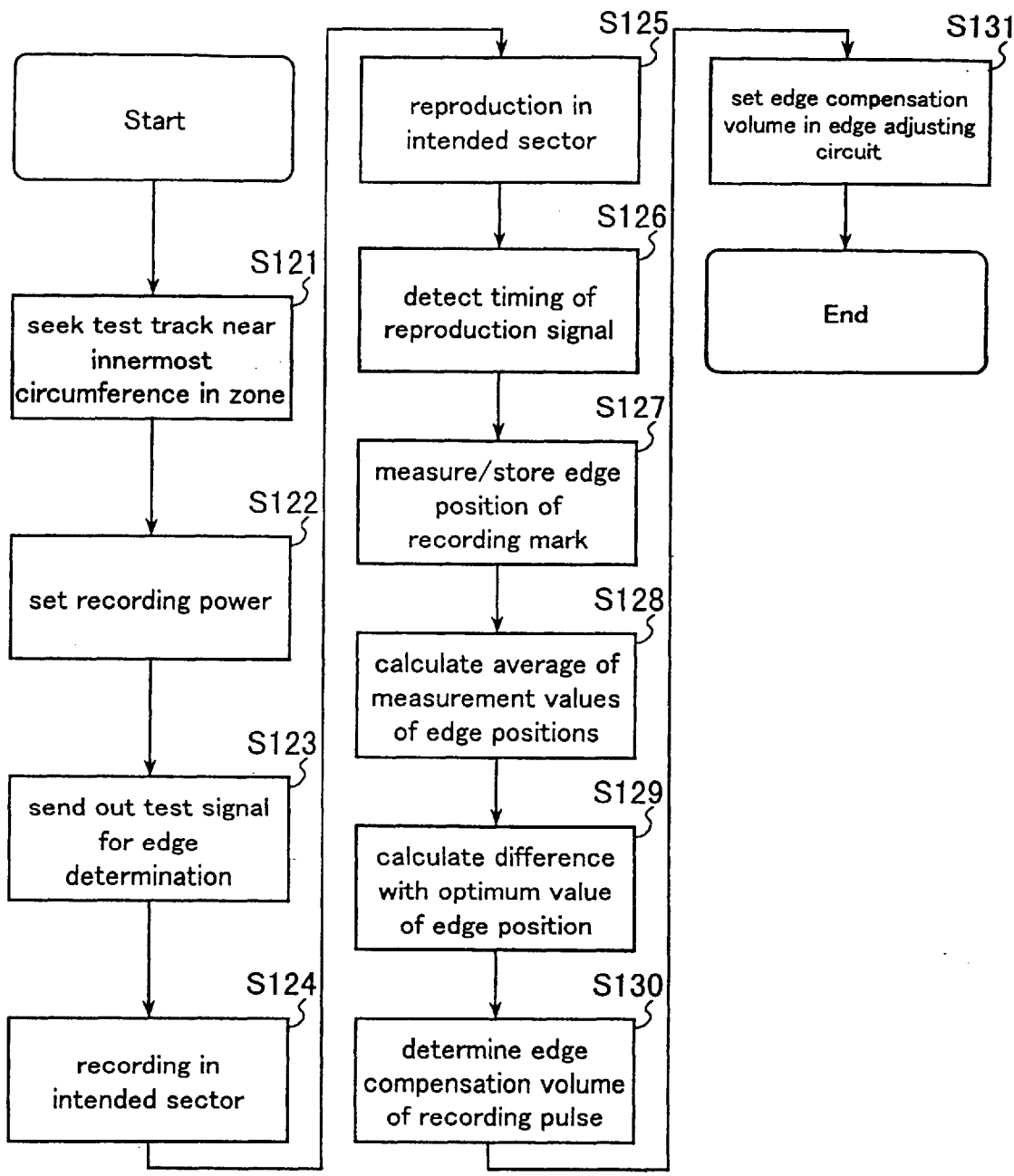
FIG. 10 is a flowchart explaining the operation of a recording/reproducing apparatus according to a sixth embodiment of the present invention.
Figure 11:
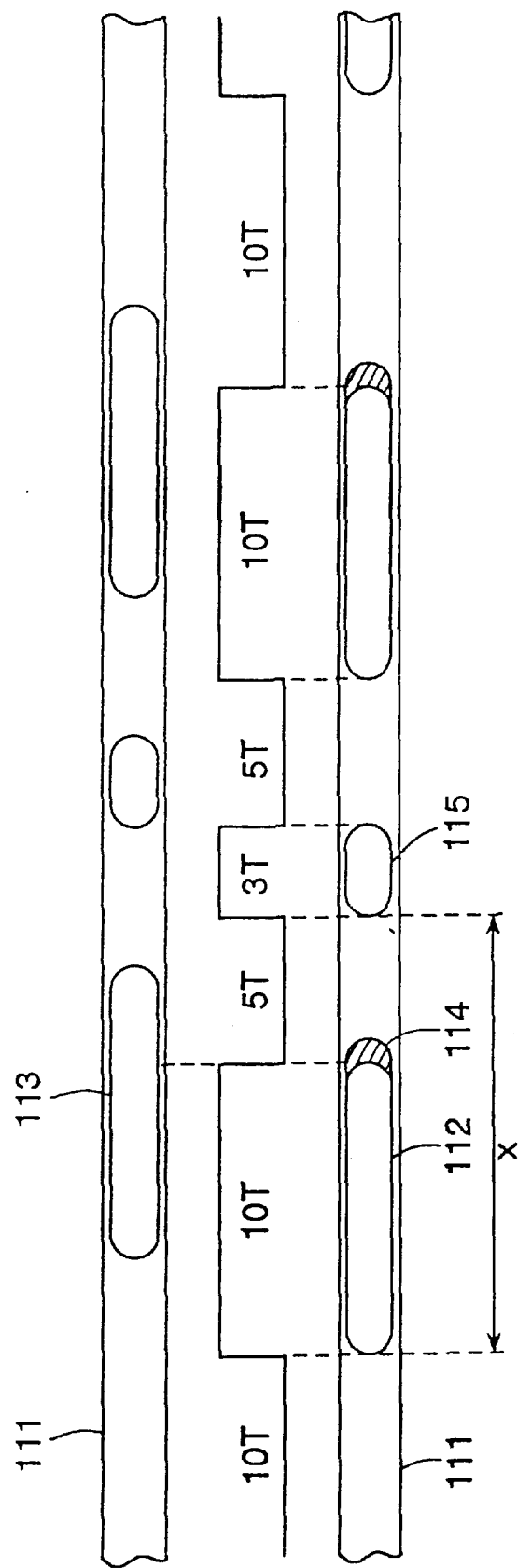
FIG. 11 is an explanatory view showing an example of a state of a track before test recording, a test signal for the test recording, and a state of the track after the test recording based on the test signal in a conventional optical disk.
Figure 12:
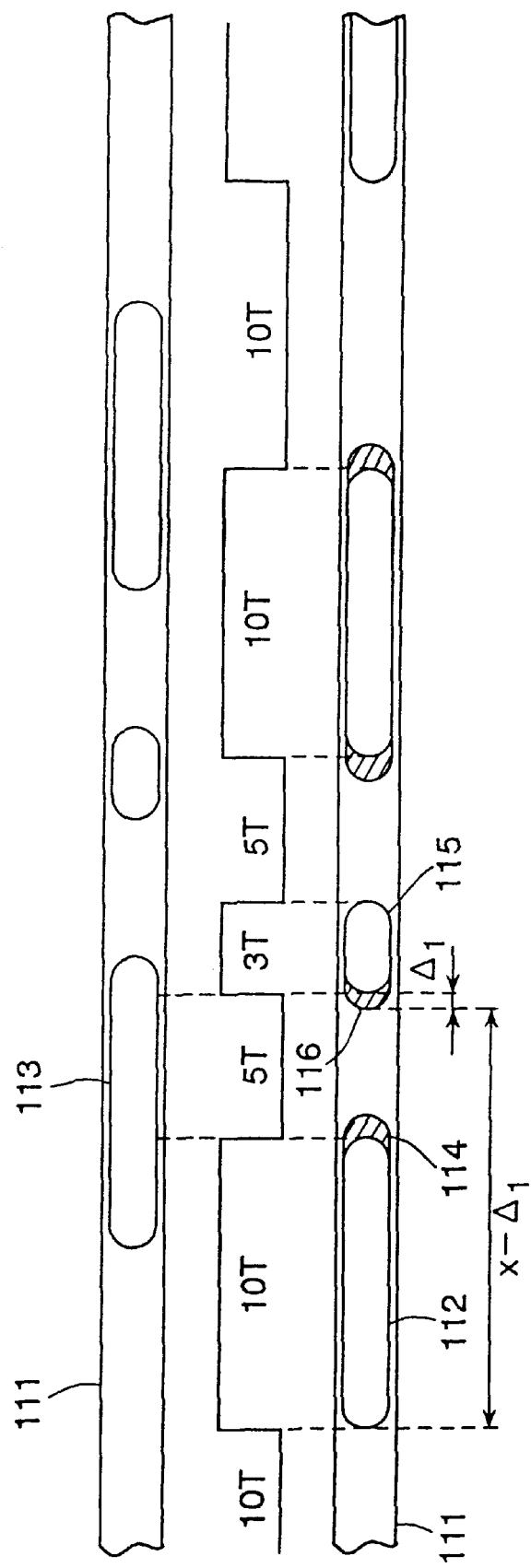
FIG. 12 is an explanatory view showing another example of a state of a track before test recording, a test signal for the test recording, and a state of the track after the test recording based on the test signal in a conventional optical disk.
Figure 13:
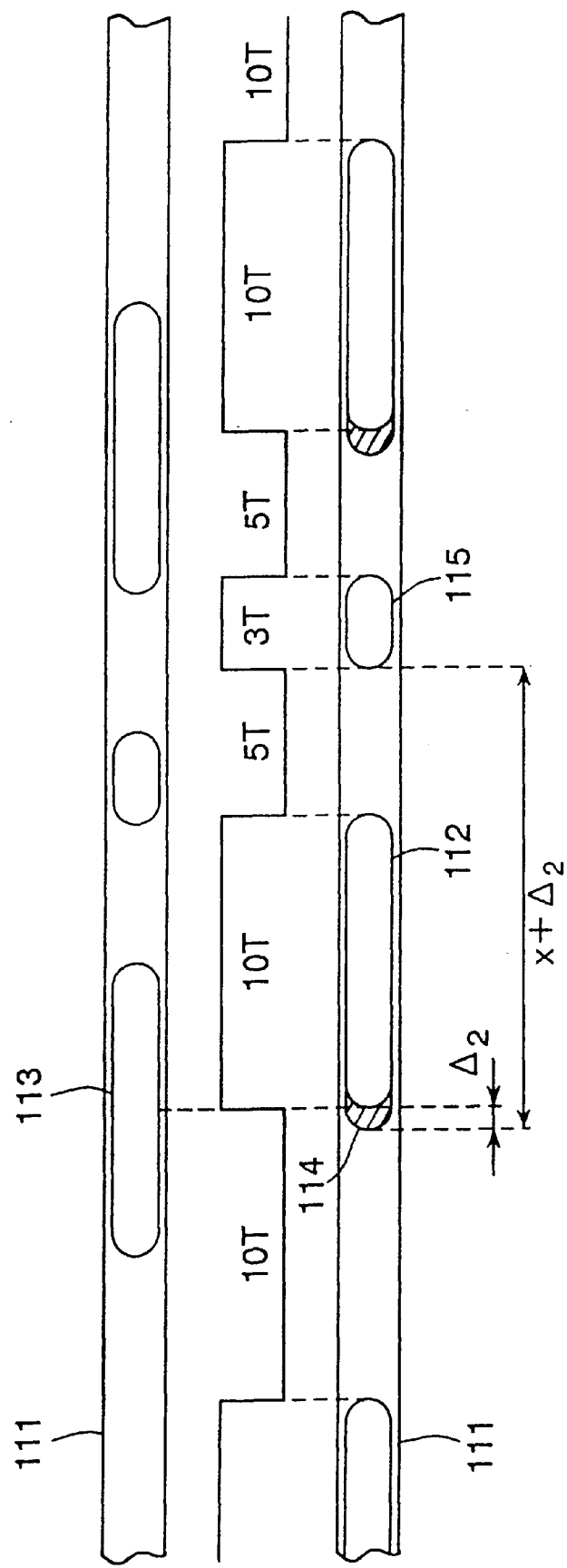
FIG. 13 is an explanatory view showing a further example of a state of a track before test recording, a test signal for the test recording, and a state of the track after the test recording based on the test signal in a conventional optical disk.
Figure 14:
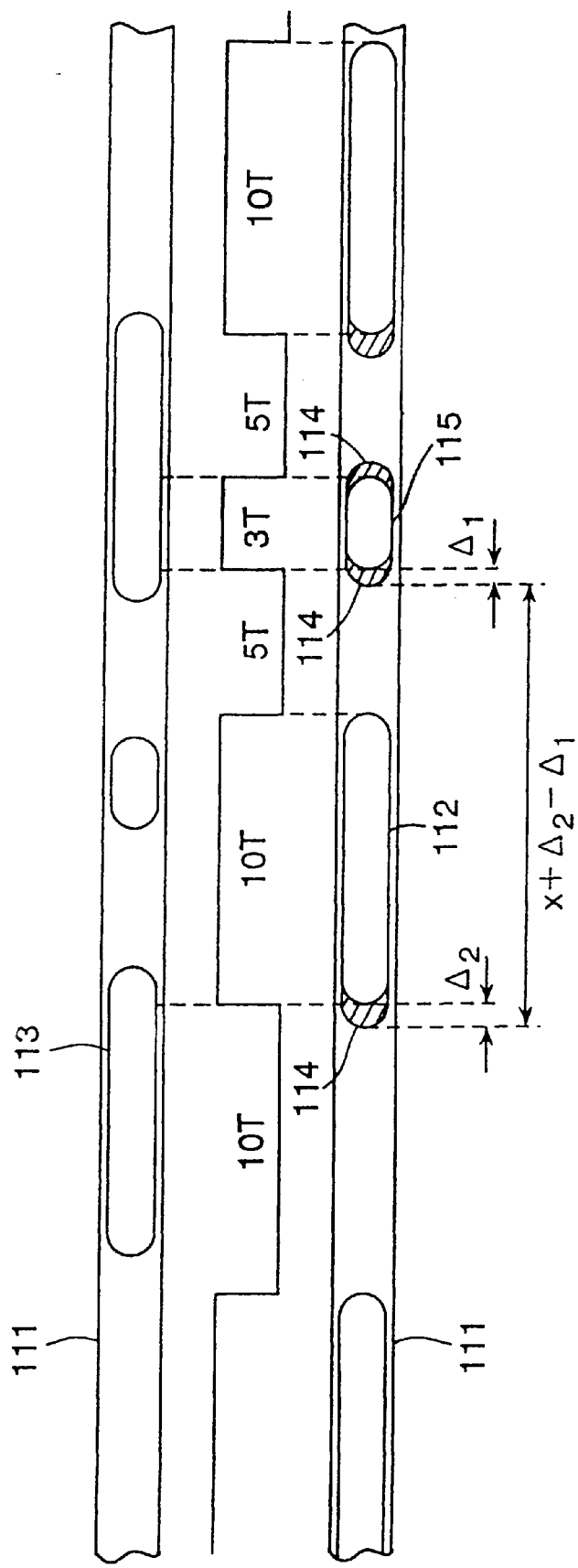
FIG. 14 is an explanatory view showing yet another example of a state of a track before test recording, a test signal for the test recording, and a state of the track after the test recording based on the test signal in a conventional optical disk.

In a sixth embodiment of the present invention, a recording/reproducing apparatus with the configuration shown in FIG. 1 in the aforementioned first embodiment is used, but as the optical disk 1, one with a Z-CLV format is used. The operation of the recording/reproducing apparatus in the present embodiment will be explained using FIG. 1 and the flowchart shown in FIG. 10 as follows.

In test recording, first the optical head 9 seeks a track in the vicinity of the innermost circumference in any zone within a recording region on the optical disk 1 (S121) and the system control circuit 2 sets the recording power in the laser drive circuit 8 to a predetermined value (S122). Then, the edge test signal generation circuit 4 sends out a test signal to the recording signal generation circuit 6 as a recording data signal (S123). The recording signal generation circuit 6 converts the recording data signal to recording pulses and the laser drive circuit 8 modulates a current for driving a laser beam source (not shown in the figure) in the optical head 9, thus carrying out the test recording on the sector (S124).

After recording the test signal, the optical head 9 reproduces the test signal from the sector in which the test recording has been carried out (S125) and the reproduction signal processing circuit 11 equalizes and binarizes a reproduction signal. Then, the edge timing detecting circuit 12 slices the binarized signal and detects an inversion interval in the signal (S126), thus measuring an interval between edges of recording marks. The measured value is stored in a memory (not shown in the figure) in the system control circuit 2 (S127). Further, the system control circuit 2 calculates the average of intervals between edges from measured values that have been stored in the memory (S128).

The system control circuit 2 determines the difference between the interval calculated at S128 and an original interval between edges in the test signal (for example, in the case of the test signals shown in FIGS. 11 to 14, the difference between 15T and the time corresponding to the interval calculated) (S129). Then, an edge position of a recording pulse (for example, the leading edge of a recording pulse for recording a 3T mark in examples as shown in FIGS. 11 to 14) is determined to be the position compensated for the above-mentioned difference (S130). The edge compensation volume is set in the recording pulse edge adjusting circuit 7 (S131).

Next, a comparative experiment carried out for confirming the effect of the present embodiment will be explained as follows. In this experiment, instead of the measurement of a bit error rate, jitter in a reproduction signal was measured by a time interval analyzer. The time interval analyzer was also used in detecting timings of edges in the reproduction signal.

Table 1 shows a zone format of a substrate of an optical disk 1 used in the experiment. This format is formed as a Z-CLV format with a constant rotation speed in each zone in which a recording region (i.e. the region where information signals actually are recorded) located between a radius of 25.0 mm to 50 mm is divided into 10 zones. The clock cycle is constant throughout the whole recording region. The present embodiment employs a format in which the linear velocity in the innermost circumference in each zone is the same. However, the linear velocity is not always required to be the same in the innermost circumference in each zone.

TABLE 1

| Zone | Radius of Innermost Circumference [mm] | Radius of Outermost Circumference [mm] | Rotation Speed [rpm] | Linear Velocity in Innermost Circumference [m/s] | Linear Velocity in Outermost Circumference [m/s] | Channel Clock [ns] | Mark Length in Innermost Circumference [μm] | Mark Length in Outermost Circumference [μm] |
|---|---|---|---|---|---|---|---|---|
| 0 | 25.00 | 27.50 | 3132 | 8.20 | 9.02 | 17.09 | 0.42 | 0.46 |
| 1 | 27.50 | 30.00 | 2847 | 8.20 | 8.95 | 17.09 | 0.42 | 0.46 |
| 2 | 30.00 | 32.50 | 2610 | 8.20 | 8.88 | 17.09 | 0.42 | 0.46 |
| 3 | 32.50 | 35.00 | 2409 | 8.20 | 8.83 | 17.09 | 0.42 | 0.45 |
| 4 | 35.00 | 37.50 | 2237 | 8.20 | 8.79 | 17.09 | 0.42 | 0.45 |
| 5 | 37.50 | 40.00 | 2088 | 8.20 | 8.75 | 17.09 | 0.42 | 0.45 |
| 6 | 40.00 | 42.50 | 1958 | 8.20 | 8.71 | 17.09 | 0.42 | 0.45 |
| 7 | 42.50 | 45.00 | 1842 | 8.20 | 8.68 | 17.09 | 0.42 | 0.45 |
| 8 | 45.00 | 47.50 | 1740 | 8.20 | 8.66 | 17.09 | 0.42 | 0.44 |
| 9 | 47.50 | 50.00 | 1649 | 8.20 | 8.63 | 17.09 | 0.42 | 0.44 |

The substrate of the optical disk 1 used was made of polycarbonate resin and had a diameter of 120 mm and a thickness of 0.6 mm. In the resin substrate, phase pits of concave and convex shapes were preformatted as address information and recording tracks were formed in a sector area. The track pitch was 1.2 μm. On the substrate, a protective film, a phase-change recording film, a protective film, and a reflection film were formed by spattering, and then a protective substrate was bonded thereto.

In this case, $ZnS—SiO_2$ was used as the protective film, Te-Sb-Ge as the phase-change recording film, and Al as the reflection film. The optical disk 1 was rotated by a spindle motor 10 at the rotation speed described in Table 1. A laser beam with a wavelength of 660 nm was focused by an objective lens with a numerical aperture (NA) of 0.6, thus carrying out recording and reproduction. The full width at half maximum of a spot size was 0.62 μm.

The power of a laser beam in test recording was set to $P_p$=11 mW, $P_b$=5 mW, and $P_r$=1 mW. A modulation system of recording information employed herein was (8–16) pulse-width modulation that is used in DVD. A mark length of 3T, which is the shortest mark, was set to 0.42 μm.

Prior to the recording of information signals, test recording was carried out on a track in the vicinity of the innermost circumference in Zone 0 to determine edge positions of recording pulses. The determination procedure followed the procedure shown in the flowchart in FIG. 2 in the first embodiment.

In all the nine combinations of lengths of marks to be recorded (a 3T mark, a 4T mark, and a mark of at least 5T) and lengths of spaces directly before the respective marks (a 3T space, a 4T space, and a space of at least 5T), respective leading ends of edge positions of recording pulses were determined. Similarly, respective rear ends of edge positions of recording pulses were determined in all the nine combinations of lengths of marks to be recorded (a 3T mark, a 4T mark, and a mark of at least 5T) and lengths of spaces directly behind the respective marks (a 3T space, a 4T space, and a space of at least 5T). The edge positions were adjusted with a precision of 0.5 ns.

In this case, an adjusted value for the edge positions in the 3T and 4T marks was different from that for the mark of at least 5T for the following reason. Since recording pulse length is short in the 3T and 4T marks, their lengths tend to be short with respect to a spot size. Therefore, the edge positions of the 3T and 4T marks are required to be different from those of the mark of at least 5T. The adjusted values for edge positions were changed in the 3T and 4T spaces and in the space of at least 5T, since the influence of thermal interference between marks cannot be ignored in the case of the 3T and 4T spaces.

Then, based on the edge positions of recording pulses determined in the test recording, random information signals modulated by the (8–16) pulse-width modulation were overwritten and thus recorded ten times on a track in the vicinity of the innermost circumference (i.e. at a radius of 25.0 mm) and a track in the vicinity of the outermost circumference in Zone 0, and then jitter in reproduction signals was measured.

Similarly in the above, test recording was carried out on a track in the vicinity of the outermost circumference (i.e. at a radius of 27.5 mm) in Zone 0 to determine edge positions of recording pulses. Then, based on the edge positions of recording pulses recorded in the test recording, random information signals modulated by the (8–16) pulse-width modulation were overwritten and thus recorded ten times on a track in the vicinity of the innermost circumference and a track in the vicinity of the outermost circumference in Zone 0, and then jitter in reproduction signals was measured. The measurement results of jitter are shown in Table 2.

TABLE 2

| | | Track for Test Recordin | |
|---|---|---|---|
| | | Innermost Circumference in Zone 0 | Outermost Circumference in Zone 0 |
| Track for Recording Information Signal | Innermost Circumference in Zone 0 | 9.3% | 10.4% |
| | Outermost Circumference in Zone 0 | 8.6% | 8.5% |

As shown in Table 2, it was found that the jitter in the random information signals was better in the vicinity of the outermost circumference in the zone regardless of whether the test recording was carried out on the track in the vicinity of the innermost circumference or on the track in the vicinity of the outermost circumference in the zone. The reason is that the recording linear density in the outermost circumference in the zone is lower than that in the innermost circumference. For instance, as shown in Table 1, the shortest mark in the outermost circumference is 1.1 times longer than one in the innermost circumference in Zone 0.

The jitter obtained when the test recording was carried out in the innermost circumference in the zone and random information signals were recorded in the outermost circumference was substantially the same as that obtained when the test recording was carried out in the outermost circumference in the zone and random information signals were recorded in the outermost circumference. On the other hand, the jitter obtained when the test recording was carried out in the outermost circumference in the zone and random information signals were recorded in the innermost circumference increased about 1% compared to that obtained when the test recording was carried out in the innermost circumference in the zone and random information signals were recorded in the innermost circumference.

The reason may be explained as follows. Since the recording linear density is low in the outermost circumference in the zone, the jitter value varies a little corresponding to the shifts in edge positions of recording pulses when the test recording is carried out. Therefore, it can be assumed that an adjustment error occurs easily in adjusting the edge positions by the test recording and the influence of the adjustment error appears as the increase in jitter value obtained when the recording is carried out in the innermost circumference.

As described above, in the present embodiment, a test signal is recorded with the recording linear density substantially equal to that with which information signals are recorded on the track in the innermost circumference in each zone on the Z-CLV disk to determine edge positions of recording pulses, thus obtaining an excellent effect in that good jitter (or a good bit error rate) can be obtained throughout from the innermost circumference to the outermost circumference in each zone and thus information signals can be recorded precisely.

In the present embodiment, the test recording was carried out in the vicinity of the innermost circumference within a zone in a recording area, i.e. the area where information signals are recorded, on the optical disk. However, by providing an area in the vicinity of the innermost circumference at least in one zone on an optical disk as a test recording area, the test recording may be carried out in the area.

As shown in Table 3, the same effect can be obtained when areas for test recording are provided on the inner and outer sides with respect to a recording area on an optical disk and the recording linear density in the areas is set to be substantially the same as that in the innermost circumference in each zone.

recording linear density substantially equal to that with which information signals are recorded on a track in the innermost circumference in each zone in a recording area, an optimum recording power can be set throughout from an inner circumference to an outer circumference in each zone and thus information signals can be recorded precisely.

Moreover, when the configuration and method as described in the first embodiment in which the recording start point shifting circuit 3 is provided, the recording start point is shifted at random and a test signal is recorded and reproduced in a plurality of sectors to determine the optimum edge positions of recording pulses also are used additionally in the present embodiment, the test recording for determining edge positions of recording marks precisely without causing variation can be carried out, which is more preferable.

In addition, when the configuration and method as described in the second embodiment in which the data pattern generation circuit 21 is provided and a data pattern having substantially no correlation with the pattern of a test signal is recorded beforehand on a track on which the test signal for determining edge positions of recording pulses is to be recorded also are used additionally, the test recording for determining edge positions of recording marks precisely without causing variation can be carried out, which is more preferable.

Further, when the configuration and method as described in the fifth embodiment in which a polarity inversion control circuit 53, a polarity inverting circuit 54, and a select circuit 55 are provided and random polarity inversion of a recording data signal is inhibited only when the test signal for determining edge positions of recording pulses is recorded also are used additionally, the number of times the optical disk can be rewritten increases and information signals can be recorded precisely, which is further preferable.

In the aforementioned first to sixth embodiments, the desirable timings for carrying out the test recording include at least the times in adjusting the recording/reproducing apparatus; on starting the recording/reproducing apparatus; after a lapse of a predetermined time from the starting; in

TABLE 3

| Zone | Radius of Innermost Circumference [mm] | Radius of Outermost Circumference [mm] | Rotation Speed [rpm] | Linear Velocity in Innermost Circumference [m/s] | Linear Velocity in Outermost Circumference [m/s] | Channel Clock [ns] | Mark Length in Innermost Circumference [$\mu$m] | Mark Length in Outermost Circumference [$\mu$m] |
|---|---|---|---|---|---|---|---|---|
| Test Recording Area | 24.90 | 25.00 | 3145 | 8.20 | 8.23 | 17.09 | 0.42 | 0.42 |
| 0 | 25.00 | 27.50 | 3132 | 8.20 | 9.02 | 17.09 | 0.42 | 0.46 |
| 1 | 27.50 | 30.00 | 2847 | 8.20 | 8.95 | 17.09 | 0.42 | 0.46 |
| 2 | 30.00 | 32.50 | 2610 | 8.20 | 8.88 | 17.09 | 0.42 | 0.46 |
| 3 | 32.50 | 35.00 | 2409 | 8.20 | 8.83 | 17.09 | 0.42 | 0.45 |
| 4 | 35.00 | 37.50 | 2237 | 8.20 | 8.79 | 17.09 | 0.42 | 0.45 |
| 5 | 37.50 | 40.00 | 2088 | 8.20 | 8.75 | 17.09 | 0.42 | 0.45 |
| 6 | 40.00 | 42.50 | 1958 | 8.20 | 8.71 | 17.09 | 0.42 | 0.45 |
| 7 | 42.50 | 45.00 | 1842 | 8.20 | 8.68 | 17.09 | 0.42 | 0.45 |
| 8 | 45.00 | 47.50 | 1740 | 8.20 | 8.66 | 17.09 | 0.42 | 0.44 |
| 9 | 47.50 | 50.00 | 1649 | 8.20 | 8.63 | 17.09 | 0.42 | 0.44 |
| Test Recording Area | 50.00 | 50.10 | 1566 | 8.20 | 8.22 | 17.09 | 0.42 | 0.42 |

Further, in the present embodiment, the test recording for determining the edge positions of recording pulses was explained. However, in the case of the test recording for determining recording power, the following effect can be obtained. When the test recording is carried out with the exchanging the optical disk; when a bit error rate of the optical disk exceeds a predetermined value; and when environmental temperature changes.

By carrying out test recording in adjusting recording/reproducing apparatuses, variable factors among the recording/reproducing apparatuses can be compensated. By carrying out test recording on starting a recording/reproducing apparatus and after a lapse of a predetermined time from the starting, variable factors in the recording/reproducing apparatus itself can be compensated. By carrying out test recording in exchanging an optical disk, variable factors between optical disks can be compensated. Similarly, by carrying out test recording when a bit error rate of an optical disk exceeds a predetermined value, variable factors in the optical disk itself can be compensated. Further, by carrying out test recording when the environmental temperature changes, the variable factors caused by the temperature dependency of a recording/reproducing apparatus and an optical disk can be compensated.

The aforementioned first to sixth embodiments employed the configuration and method of recording a specific test signal for determining edge positions of recording pulses and then measuring an interval between edges in a signal reproduced. However, the same effect can be obtained in the configuration and method in which plural kinds of test signals (for example, plural kinds of random signals) with variable edge positions are recorded, then a bit error rate (or jitter) is measured, and an edge position of a recording pulse set based on the test signal causing the lowest bit error rate (or jitter) is determined as an optimum value.

The aforementioned first to sixth embodiments employed the configuration and method in which the difference between an interval between edges of recording marks measured by recording a specific test signal and an optimum interval between edges is compensated in the edge position adjusting circuit to determine edge positions of recording pulses. However, the same effect can be obtained in the configuration and method in which plural kinds of test signals in which edge positions of recording pulses are changed gradually are recorded, an interval between edges of recording marks are measured in each test signal, and then an edge position of a recording pulse in the test signal in which an optimum interval between edges is obtained is set in the edge position adjusting circuit as an optimum value.

Further, in the aforementioned first to sixth embodiments, an interval between edges of recording marks was measured in the edge timing detecting circuit and the system control circuit stored measured intervals between edges and calculated the average thereof. However, these processes may be carried out with an external measuring instrument such as, for example, a time interval analyzer, outside the recording/reproducing apparatus.

In addition, in the aforementioned first to sixth embodiments, the test signal generation circuit was provided for generating test signals. However, signals modulated by allowing the system control circuit to generate specific information signals may be used as the test signals. In this case, it is not necessary to provide the test signal generation circuit separately, thus reducing the size of the apparatus. Furthermore, those obtained by adding an error correction code to the test signals or carrying out interleave processing also may be used. The bit error rate may be measured after demodulation and error correction.

The number of layers, configuration, and materials of the above-mentioned optical disk are not limited to those mentioned above. The above-mentioned method can be applied to any media, for example, using magnet-optical materials, dye materials, or the like as long as the media have different optical characteristics in recording marks and in the regions without marks. However, in the case of optical disks using a phase-change material as a recording film, optical absorption is different between crystalline and amorphous states and therefore particularly a great effect can be obtained in the above-mentioned test recording methods.

In addition, the aforementioned recording power, linear velocity, modulation method, recording density, length and position of each pulse, pattern of test signals, and the like are not limited to those used in the embodiments. Needless to say, they can be set suitably according to the recording conditions and media. Moreover, the measurement of a bit error rate may be replaced by the measurement of jitter and vice versa.

The embodiments described above are to be considered in all respects as illustrative for the purpose of making the technical contents of the present invention clear and the present invention is not to be interpreted by limiting to such embodiments. The present invention can be carried out by changing the embodiments variously within the spirit and the range described in the appended claims, and the present invention should be interpreted broadly.

What is claimed is:

1. An optical information recording apparatus in which a rewritable optical information recording medium is used and, before recording an information signal on the optical information recording medium, test recording is carried out, the optical information recording apparatus comprises:

a test signal generation means that generates an edge test signal and a power test signal;

a recording means that converts the edge test signal, the power test signal, and the information signal to a recording data signal, drives a light source based on the recording data signal, and records the edge test signal, the power test signal, and the information signal on the optical information recording medium;

a recording pulse edge adjusting means that adjusts edge positions of recording pulses in the recording data signal;

a reproducing means that reproduces signals from the optical information recording medium;

a first recording condition determination means that allows the test signal generation means to supply the edge test signal to the recording means to record the edge test signal on the optical information recording medium and determines a set value for the edge positions of recording pulses for the recording pulse edge adjusting means based on a result obtained by reproducing the edge test signal from the optical information recording medium by the reproducing means; and a second recording condition determination means that allows the test signal generation means to supply the power test signal to the recording means to record the power test signal on the optical information recording medium and determines a set value of recording power of the light source for the recording means based on a result obtained by reproducing the power test signal from the optical information recording medium by the reproducing means, wherein the second recording condition determination means determines a proper value of the recording power of the light source for the recording means based on a result obtained by reproducing the power test signal recorded with edge positions of the recording pulses whose set value is an initial value, and the first recording condition determination means determines a proper value for the edge positions of recording pulses for the recording pulse edge adjusting means based on a result obtained by reproducing the edge test signal recorded with a recording power of which the set value determined by the second recording condition determination means is the proper value.

2. The optical information recording apparatus according to claim 1,
wherein the optical information recording apparatus further comprises a recording start point shifting means that shifts a recording start point at random in each sector on the optical information recording medium when the test recording of the edge test signal is carried out.

3. The optical information recording apparatus according to claim 1,
wherein the optical information recording apparatus further comprises a data pattern generation means that generates a data pattern having substantially no correlation with the edge test signal and the data pattern is recorded before the test recording of the edge test signal by the recording means in an area where the edge test signal is to be recorded on the optical information recording medium.

4. The optical information recording apparatus according to claim 1,
wherein the optical information recording apparatus further comprises a measurement means for measuring either a bit error rate or jitter of a reproduction signal obtained by reproducing the power test signal from the optical information recording medium and the second recording condition determination means determines the proper value of the recording power based on a recording power value that allows a measurement result by the measurement means to be a predetermined value or less.

5. The optical information recording apparatus according to claim 1,
wherein the first recording condition determination means is provided with a means for comparing an interval between edges in the edge test signal and that in a reproduction signal obtained by reproducing the edge test signal from the optical information recording medium to determine the proper value for the edge positions of recording pulses.

6. The optical information recording apparatus according to claim 1,
wherein the optical information recording apparatus further comprises a measurement means for measuring either a bit error rate or jitter of the reproduction signal obtained by reproducing the edge test signal from the optical information recording medium and the first recording condition determination means determines an edge position of a recording pulse that allows a measurement result by the measurement means to be the minimum as the proper value.

7. The optical information recording apparatus according to claim 1,
wherein the first recording condition determination means determines the initial value for the edge positions of recording pulses for the recording pulse edge adjusting means based on a result obtained by reproducing the edge test signal recorded with a recording power whose set value is a predetermined value.

8. The optical information recording apparatus according to claim 7,
wherein the optical information recording apparatus further comprises a recording start point shifting means that shifts a recording start point at random in each sector on the optical information recording medium when the test recording of the edge test signal is carried out.

9. The optical information recording apparatus according to claim 7,
wherein the optical information recording apparatus further comprises a data pattern generation means that generates a data pattern having substantially no correlation with the edge test signal and the data pattern is recorded before the test recording of the edge test signal by the recording means in an area where the edge test signal is to be recorded on the optical information recording medium.

10. The optical information recording apparatus according to claim 7,
wherein the first recording condition determination means is provided with a means for comparing an interval between edges in the edge test signal and that in a reproduction signal obtained by reproducing the edge test signal from the optical information recording medium to determine a proper value for the edge positions of recording pulses.

11. The optical information recording apparatus according to claim 7,
wherein the optical information recording apparatus further comprises a measurement means for measuring either a bit error rate or jitter of the reproduction signal obtained by reproducing the edge test signal from the optical information recording medium, the first recording condition determination means determines an edge position of a recording pulse that allows a measurement result by the measurement means to be the minimum as a proper value, and the proper value for the edge positions of recording pulses thus determined is used as the initial value.

12. The optical information recording apparatus according to claim 1,
wherein the test recording and recording conditions are set at least at one timing selected from the times: in adjusting the optical information recording apparatus; on starting the optical information recording apparatus; after a lapse of a predetermined time from the starting; in exchanging the optical information recording medium; when a bit error rate of the optical information recording medium exceeds a predetermined value; and when environmental temperature of the optical information recording apparatus changes.

13. The optical information recording apparatus according to claim 1,
wherein a recording film of the optical information recording medium is formed of a phase-change material.

14. An optical information recording method in which a rewritable optical information recording medium is used and, before recording an information signal on the optical information recording medium, test recording is carried out, the optical information recording method comprising steps of:
(a) setting edge positions of recording pulses to an initial value and recording a power test signal on the optical information recording medium;
(b) determining a proper value of recording power of a light source based on a result obtained by reproducing the power test signal recorded at the step (a) from the optical information recording medium;
(c) recording an edge test signal on the optical information recording medium based on the recording power determined at the step (b); and
(d) determining a proper value for the edge positions of recording pulses based on a result obtained by reproducing the edge test signal recorded at the step (c) from the optical information recording medium.

15. The optical information recording method according to claim 14,
wherein a recording start point on the optical information recording medium is shifted at random in each sector at the step (c).

16. The optical information recording method according to claim 14,
wherein the optical information recording method comprises, before the step (c), a step of recording a data pattern having substantially no correlation with the edge test signal in an area for carrying out the test recording on the optical information recording medium.

17. The optical information recording method according to claim 14,
wherein the step (b) comprises a step of measuring either a bit error rate or jitter of a reproduction signal obtained by reproducing the power test signal from the optical information recording medium and the proper value of the recording power is determined based on a recording power value that allows the measurement result to be a predetermined valued or less.

18. The optical information recording method according to claim 14,
wherein the step (d) comprises a step of comparing an interval between edges in the edge test signal and that in a reproduction signal obtained by reproducing the edge test signal from the optical information recording medium.

19. The optical information recording method according to claim 14,
wherein the step (d) comprises a step of measuring either a bit error rate or jitter of a reproduction signal obtained by reproducing the edge test signal from the optical information recording medium and an edge position of a recording pulse that allows a measurement result to be the minimum is determined as the proper value.

20. The optical information recording method according to claim 14,
wherein the optical information recording method further comprises, prior to the step (a), steps of:
(e-1) recording the edge test signal on the optical information recording medium with recording power being set to a predetermined value; and
(e-2) determining a proper value for the edge positions of recording pulses based on a result obtained by reproducing the edge test signal recorded at the step (e-1) from the optical information recording medium, and
the proper value for the edge positions of recording pulses determined at the step (e-2) is used as the initial value for the edge positions of recording pulses at the step (a).

21. The optical information recording method according to claim 20,
wherein a recording start point on the optical information recording medium is shifted at random in each sector at the step (e-1).

22. The optical information recording method according to claim 20,
wherein the optical information recording method comprises, before the step (e-1), a step of recording a data pattern having substantially no correlation with the edge test signal in an area for carrying out the test recording on the optical information recording medium.

23. The optical information recording method according to claim 20,
wherein the step (e-2) comprises a step of comparing an interval between edges in the edge test signal and that in a reproduction signal obtained by reproducing the edge test signal from the optical information recording medium.

24. The optical information recording method according to claim 20,
wherein the step (e-2) comprises a step of measuring either a bit error rate or jitter of a reproduction signal obtained by reproducing the edge test signal from the optical information recording medium and an edge position of a recording pulse that allows a measurement result to be the minimum is determined as the proper value.

25. The optical information recording method according to claim 14,
wherein a recording film of the optical information recording medium is formed of a phase-change material.

26. An optical information recording apparatus that records information on an optical information recording medium by an optical information recording method in which a rewritable optical information recording medium is used and, before recording an information signal on the optical information recording medium, test recording is carried out, the optical information recording method comprising steps of:
(a) setting edge positions of recording pulses to an initial value and recording a power test signal on the optical information recording medium;
(b) determining a proper value of recording power of a light source based on a result obtained by reproducing the power test signal recorded at the step (a) from the optical information recording medium;
(c) recording an edge test signal on the optical information recording medium based on the recording power determined at the step (b); and
(d) determining a proper value for the edge positions of recording pulses based on a result obtained by reproducing the edge test signal recorded at the step (c) from the optical information recording medium,
wherein the test recording and recording conditions are set at least at one timing selected from the times: in adjusting the recording/reproducing apparatus; on starting the recording/reproducing apparatus; after a lapse of a predetermined time from the starting; in exchanging the optical information recording medium; when a bit error rate of the optical information recording medium exceeds a predetermined value; and when environmental temperature of the optical information recording apparatus changes.

27. An optical information recording apparatus in which a rewritable optical information recording medium is used and, before recording an information signal on the optical information recording medium, test recording is carried out using a test signal on the optical information recording medium, the optical information recording apparatus comprising:
a test signal generation means that generates a test signal;
a recording means that converts the test signal and the information signal to a recording data signal, drives a light source based on the recording data signal, and records the test signal and the information signal on the optical information recording medium;

a polarity inverting means that inverts polarity of the recording data signal;

a polarity inversion control means that supplies only one of an inverted signal and a non-inverted signal of the recording data signal converted from the test signal to the recording means when the test recording is carried out and any one selected at random in each sector from an inverted signal and a non-inverted signal of the recording data signal converted from the information signal to the recording means when the information signal is recorded;

a recording pulse edge adjusting means that adjusts edge positions of recording pulses in the recording data signal;

a reproducing means that reproduces signals from the optical information recording medium; and a recording condition determination means that determines a proper value for the edge positions of recording pulses based on a result obtained by reproducing the test signal from the optical information recording medium by the reproducing means and supplies the proper value to the recording pulse edge adjusting means.

28. The optical information recording apparatus according to claim 27, wherein the optical information recording apparatus further comprises a recording start point shifting means that shifts a recording start point of the recording data signal at random in each sector on the optical information recording medium.

29. The optical information recording apparatus according to claim 27, wherein the optical information recording apparatus further comprises a data pattern generation means that generates a data pattern having substantially no correlation with the test signal and the data pattern is recorded on a track intended for the test recording before the test recording is carried out.

30. The optical information recording apparatus according to claim 27, wherein the recording condition determination means is provided with a means for comparing an interval between edges in the test signal and that in a reproduction signal obtained by reproducing the test signal from the optical information recording medium to determine the proper value for the edge positions of recording pulses.

31. The optical information recording apparatus according to claim 27, wherein the optical information recording apparatus further comprises a measurement means for measuring either a bit error rate or jitter of a reproduction signal obtained by reproducing the test signal from the optical information recording medium, and the recording condition determination means determines an edge position of a recording pulse that allows a measurement result by the measurement means to be a predetermined value or less as the proper value.

32. The optical information recording apparatus according to claim 27, wherein the optical information recording apparatus is provided with:

a second test signal generation means that generates a second test signal; and a second recording condition determination means that records any one of an inverted signal and a non-inverted signal of the second test signal on the optical information recording medium with edge positions of recording pulses being set to the proper value by the recording pulse edge adjusting means, the inverted signal and the non-inverted signal being supplied from the second test signal generation means and being selected at random in each sector by the polarity inversion control means, and that determines a proper value of the recording power of the light source for the recording means based on a result obtained by reproducing the second test signal from the optical information recording medium by the reproducing means.

33. The optical information recording apparatus according to claim 32, wherein the optical information recording apparatus further comprises a measurement means for measuring either a bit error rate or jitter of a reproduction signal obtained by reproducing the second test signal from the optical information recording medium, and the second recording condition determination means determines the proper value of the recording power based on a recording power value that allows a measurement result by the measurement means to be a predetermined value or less.

34. The optical information recording apparatus according to claim 27, wherein the test recording and recording conditions are set at least at one timing selected from the times: in adjusting the optical information recording apparatus; on starting the optical information recording apparatus; after a lapse of a predetermined time from the starting; in exchanging the optical information recording medium; when a bit error rate of the optical information recording medium exceeds a predetermined value; and when environmental temperature of the optical information recording apparatus changes.

35. The optical information recording apparatus according to claim 27, wherein a recording film of the optical information recording medium is formed of a phase-change material.

36. An optical information recording method in which a rewritable optical information recording medium is used and, before recording an information signal on the optical information recording medium, test recording is carried, the optical information recording method comprising steps of:

(a) determining randomly whether polarity of a first test signal is to be inverted and carrying out test recording of only one of an inverted signal and a non-inverted signal of the first test signal on a predetermined track of the optical information recording medium;

(b) determining a proper value for edge positions of recording pulses based on a result obtained by reproducing the first test signal recorded at the step (a) from the optical information recording medium; and (c) selecting, at random in each sector, any one of an inverted signal and a non-inverted signal of the information signal to be recorded on the optical information recording medium and recording a signal selected on the optical information recording medium with edge positions of recording pulses being set to the proper value determined at the step (b).

37. The optical information recording method according to claim 36, wherein a recording start point on the optical information recording medium is shifted at random in each sector at the step (a).

38. The optical information recording method according to claim 36,
wherein the optical information recording method comprises, before the step (a), a step of recording a data pattern having substantially no correlation with the first test signal on the predetermined track.

39. The optical information recording method according to claim 36,
wherein the step (b) comprises a step of comparing an interval between edges in the first test signal and that in a reproduction signal obtained by reproducing the first test signal from the optical information recording medium.

40. The optical information recording method according to claim 36,
wherein the step (b) comprises a step of measuring either a bit error rate or jitter of a reproduction signal obtained by reproducing the first test signal from the optical information recording medium and an edge position of a recording pulse that allows a measurement result to be the minimum is determined as the proper value.

41. The optical information recording method according to claim 36,
wherein the optical information recording method further comprises, between the steps (b) and (c), steps of:
(b-1) selecting any one of an inverted signal and a non-inverted signal of a second test signal at random in each sector and recording a signal selected on the optical information recording medium with edge positions of recording pulses being set to the proper value determined at the step (b); and
(b-2) determining a proper value of a recording power based on a result obtained by reproducing the second test signal recorded at the step (b-1) from the optical information recording medium.

42. The optical information recording method according to claim 41,
wherein the step (b-2) comprises a step of measuring either a bit error rate or jitter of a reproduction signal obtained by reproducing the second test signal from the optical information recording medium and the proper value of the recording power is determined based on a recording power value that allows a measurement result to be a predetermined value or less.

43. The optical information recording method according to claim 36,
wherein a recording film of the optical information recording medium is formed of a phase-change material.

44. An optical information recording apparatus that records information on an optical information recording medium by an optical information recording method in which a rewritable optical information recording medium is used and, before recording an information signal on the optical information recording medium, test recording is carried, the optical information recording method comprising steps of:
(a) determining randomly whether polarity of a first test signal is to be inverted and carrying out test recording of only one of an inverted signal and a non-inverted signal of the first test signal on a predetermined track of the optical information recording medium;
(b) determining a proper value for edge positions of recording pulses based on a result obtained by reproducing the first test signal recorded at the step (a) from the optical information recording medium; and
(c) selecting, at random in each sector, any one of an inverted signal and a non-inverted signal of the information signal to be recorded on the optical information recording medium and recording a signal selected on the optical information recording medium with edge positions of recording pulses being set to the proper value determined at the step (b),
wherein the test recording and recording conditions are set at least at one timing selected from the times: in adjusting the recording/reproducing apparatus; on starting the recording/reproducing apparatus; after a lapse of a predetermined time from the starting; in exchanging the optical information recording medium; when a bit error rate of the optical information recording medium exceeds a predetermined value; and when environmental temperature of the optical information recording apparatus changes.

* * * * *

UNITED STATES PATENT AND TRADEMARK OFFICE
CERTIFICATE OF CORRECTION

PATENT NO.   : 6,529,457 B1
DATED        : March 4, 2003
INVENTOR(S)  : Narumi et al.

It is certified that error appears in the above-identified patent and that said Letters Patent is hereby corrected as shown below:

<u>Column 35,</u>
Line 18, "disk 1used" should read -- disk 1 used --

<u>Column 43,</u>
Line 23, "valued" should read -- value --

Signed and Sealed this

Sixteenth Day of March, 2004

JON W. DUDAS
*Acting Director of the United States Patent and Trademark Office*